United States Patent
Baghel

(10) Patent No.: US 11,223,932 B2
(45) Date of Patent: Jan. 11, 2022

(54) VEHICLE-TO-EVERYTHING FEEDBACK CHANNEL DESIGN

(71) Applicant: QUALCOMM Incorporated, San Diego, CA (US)

(72) Inventor: Sudhir Kumar Baghel, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/872,374

(22) Filed: Jan. 16, 2018

(65) Prior Publication Data

US 2018/0220280 A1 Aug. 2, 2018

Related U.S. Application Data

(60) Provisional application No. 62/452,738, filed on Jan. 31, 2017.

(51) Int. Cl.
*H04W 4/40* (2018.01)
*H04W 72/04* (2009.01)
(Continued)

(52) U.S. Cl.
CPC .............. *H04W 4/40* (2018.02); *H04L 67/12* (2013.01); *H04L 67/32* (2013.01); *H04W 4/12* (2013.01);
(Continued)

(58) Field of Classification Search
None
See application file for complete search history.

(56) References Cited

U.S. PATENT DOCUMENTS 6,810,258 B1 * 10/2004 Vialen ................. H04W 72/042
370/322
8,935,414 B2 * 1/2015 Lee ..................... H04L 12/2838
709/228
(Continued)

FOREIGN PATENT DOCUMENTS

CN 102742339 A 10/2012
CN 105519232 A 4/2016
(Continued)

OTHER PUBLICATIONS

International Search Report and Written Opinion—PCT/US2018/014002—ISA/EPO—dated Jun. 6, 2018.
(Continued)

*Primary Examiner* — Noel R Beharry
*Assistant Examiner* — Rodrick Mak

(57) ABSTRACT

Methods, systems, and devices for wireless communication are described. For example, a requesting device may transmit a sensor data request message to a responding device. The sensor data request message may include a token identifier associated with the sensor data request message. The requesting device may receive a sensor data response message from the responding device. The sensor data response message may include a first indication of the token identifier at a first layer and a second indication of the token identifier at a second layer. The first layer may be a physical layer that is a lower layer than the second layer. The requesting device may transmit a first feedback message to the responding device and in response to detecting the first indication of the token identifier at the first layer.

11 Claims, 13 Drawing Sheets

(51) Int. Cl.
*H04L 29/08* (2006.01)
*H04W 4/12* (2009.01)
*H04W 4/38* (2018.01)
*H04L 5/00* (2006.01)
*H04L 5/14* (2006.01)
*H04L 1/16* (2006.01)

(52) U.S. Cl.
CPC ........... *H04W 4/38* (2018.02); *H04W 72/048* (2013.01); *H04L 1/16* (2013.01); *H04L 5/001* (2013.01); *H04L 5/0007* (2013.01); *H04L 5/0023* (2013.01); *H04L 5/14* (2013.01)

(56) References Cited

U.S. PATENT DOCUMENTS

| | | | |
|---|---|---|---|
| 9,288,021 B2 | 3/2016 | Zhang et al. | |
| 9,537,956 B1 | 1/2017 | Sibenac et al. | |
| 2008/0008168 A1* | 1/2008 | Nadeau | H04L 69/22 370/389 |
| 2008/0147804 A1* | 6/2008 | Gyure | H04L 51/18 709/206 |
| 2009/0307554 A1* | 12/2009 | Marinier | H04L 1/1812 714/748 |
| 2009/0323597 A1* | 12/2009 | Harada | H04B 7/2653 370/329 |
| 2010/0195636 A1* | 8/2010 | Nakashima | H04W 72/12 370/342 |
| 2010/0220675 A1* | 9/2010 | Chun | H04B 7/0632 370/329 |
| 2010/0287402 A1* | 11/2010 | Kim | H04J 3/067 713/400 |
| 2012/0002589 A1* | 1/2012 | Saifullah | H04W 36/38 370/315 |
| 2012/0099419 A1* | 4/2012 | Kim | H04L 1/1854 370/216 |
| 2013/0195079 A1* | 8/2013 | Xu | H04W 74/08 370/335 |
| 2013/0223365 A1 | 8/2013 | Choi et al. | |
| 2014/0006586 A1* | 1/2014 | Hong | H04L 61/6004 709/223 |
| 2014/0282093 A1 | 9/2014 | Burke et al. | |
| 2014/0364089 A1* | 12/2014 | Lienhart | H04W 4/12 455/412.2 |
| 2016/0042644 A1 | 2/2016 | Velusamy et al. | |
| 2016/0180609 A1 | 6/2016 | Gompert et al. | |
| 2017/0078288 A1* | 3/2017 | Wu | H04L 63/0876 |
| 2017/0134168 A1* | 5/2017 | Barnett | G06Q 20/3829 |
| 2018/0332611 A1* | 11/2018 | Li | H04L 1/16 |
| 2019/0310614 A1* | 10/2019 | Huard | H04W 12/001 |
| 2020/0245394 A1* | 7/2020 | Wu | H04W 4/20 |
| 2020/0314613 A1* | 10/2020 | Lee | H04W 4/40 |

FOREIGN PATENT DOCUMENTS

| | | | |
|---|---|---|---|
| FR | 1663285 | * | 12/2016 |
| WO | WO-2009135194 A2 | | 11/2009 |
| WO | WO-2017014592 A1 | | 1/2017 |

OTHER PUBLICATIONS

Session Chairman (LG Electronics): "Report of the LTE UP Session," 3GPP TSG RAN WG2 #92, R2-157011, Nov. 16-20, Nov. 18, 2015, pp. 1-13.

Taiwan Search Report—TW107101669—TIPO—dated Aug. 12, 2021.

* cited by examiner

VEHICLE-TO-EVERYTHING FEEDBACK CHANNEL DESIGN

CROSS REFERENCES

The present Application for Patent claims priority to U.S. Provisional Patent Application No. 62/452,738 by Baghel, entitled "Vehicle-To-Everything Feedback Channel Design," filed Jan. 31, 2017, assigned to the assignee hereof.

INTRODUCTION

The following relates generally to wireless communication, and more specifically to vehicle-to-everything feedback channel design.

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

Wireless communication systems may include or support networks used for vehicle based communications, also referred to as vehicle-to-everything (V2X), vehicle-to-vehicle (V2V) networks, and/or cellular V2X (C-V2X) networks. Vehicle based communication networks may provide always on telematics where UEs, e.g., vehicle UEs (v-UEs), communicate directly to the network (V2N), to pedestrian UEs (V2P), to infrastructure devices (V2I), and to other v-UEs (e.g., via the network). The vehicle based communication networks may support a safe, always-connected driving experience by providing intelligent connectivity where traffic signal/timing, real-time traffic and routing, safety alerts to pedestrians/bicyclist, collision avoidance information, etc., are exchanged.

Such networks supporting vehicle based communications, however, may also be associated with various requirements, e.g., communication requirements, security and privacy requirements, etc. Example requirements may include, but are not limited to, reduced latency requirements, higher reliability requirements, and the like. For example, vehicle based communications may include communicating sensor data that may support self-driving cars. Sensor data may be used between vehicles to improve safety in self-driving cars.

SUMMARY

A method of wireless communication is described. The method may include transmitting a sensor data request message to a responding device, the sensor data request message comprising a token identifier associated with the sensor data request message, receiving, from the responding device, a sensor data response message, the sensor data response message comprising a first indication of the token identifier at a first layer and a second indication of the token identifier at a second layer, wherein the first layer is a physical layer that is a lower layer than the second layer, and transmitting a first feedback message responsive to detecting the first indication of the token identifier at the first layer.

An apparatus for wireless communication is described. The apparatus may include means for transmitting a sensor data request message to a responding device, the sensor data request message comprising a token identifier associated with the sensor data request message, means for receiving, from the responding device, a sensor data response message, the sensor data response message comprising a first indication of the token identifier at a first layer and a second indication of the token identifier at a second layer, wherein the first layer is a physical layer that is a lower layer than the second layer, and means for transmitting a first feedback message responsive to detecting the first indication of the token identifier at the first layer.

Another apparatus for wireless communication is described. The apparatus may include a processor, memory in electronic communication with the processor, and instructions stored in the memory. The instructions may be operable to cause the processor to transmit a sensor data request message to a responding device, the sensor data request message comprising a token identifier associated with the sensor data request message, receive, from the responding device, a sensor data response message, the sensor data response message comprising a first indication of the token identifier at a first layer and a second indication of the token identifier at a second layer, wherein the first layer is a physical layer that is a lower layer than the second layer, and transmit a first feedback message responsive to detecting the first indication of the token identifier at the first layer.

A non-transitory computer readable medium for wireless communication is described. The non-transitory computer-readable medium may include instructions operable to cause a processor to transmit a sensor data request message to a responding device, the sensor data request message comprising a token identifier associated with the sensor data request message, receive, from the responding device, a sensor data response message, the sensor data response message comprising a first indication of the token identifier at a first layer and a second indication of the token identifier at a second layer, wherein the first layer is a physical layer that is a lower layer than the second layer, and transmit a first feedback message responsive to detecting the first indication of the token identifier at the first layer.

Some examples of the method, apparatus, and non-transitory computer-readable medium described above may further include processes, features, means, or instructions for transmitting a second feedback message responsive to successful decoding the sensor data response message by the second layer and detecting the second indication of the token identifier at the second layer.

Some examples of the method, apparatus, and non-transitory computer-readable medium described above may further include processes, features, means, or instructions for identifying a mapping between the received sensor data response message and the first feedback message, wherein the first feedback message may be transmitted according to the mapping.

In some examples of the method, apparatus, and non-transitory computer-readable medium described above, the mapping comprises the sensor data response message being received on a control channel and the first feedback message being transmitted on a feedback channel associated with sensor data.

In some examples of the method, apparatus, and non-transitory computer-readable medium described above, the first feedback message comprises an indication of the token identifier.

Some examples of the method, apparatus, and non-transitory computer-readable medium described above may further include processes, features, means, or instructions for determining that the first indication may be undetected at the first layer. Some examples of the method, apparatus, and non-transitory computer-readable medium described above may further include processes, features, means, or instructions for refraining from transmitting the first feedback message based at least in part on the determining or transmitting the first feedback message that indicates the first indication was undetected at the first layer.

Some examples of the method, apparatus, and non-transitory computer-readable medium described above may further include processes, features, means, or instructions for determining that the sensor data response message comprises a plurality of token identifiers, each of the plurality of token identifiers associated with a corresponding sensor data request message. Some examples of the method, apparatus, and non-transitory computer-readable medium described above may further include processes, features, means, or instructions for identifying a portion of the sensor data response message having the token identifier associated with the transmitted sensor data request message.

Some examples of the method, apparatus, and non-transitory computer-readable medium described above may further include processes, features, means, or instructions for identifying a subframe mapping configuration associated with detecting the first indication of the token identifier at the first layer, wherein the first feedback message may be transmitted in a subframe according to the subframe mapping configuration.

In some examples of the method, apparatus, and non-transitory computer-readable medium described above, the subframe mapping configuration comprises transmitting the first feedback message in the same subframe as the sensor data response message may be received in.

In some examples of the method, apparatus, and non-transitory computer-readable medium described above, the subframe mapping configuration comprises transmitting the first feedback message in a different subframe from the subframe that the sensor data response message may be received in.

A method of wireless communication is described. The method may include receiving a sensor data request message from a requesting device, the sensor data request message comprising a token identifier associated with the sensor data request message, configuring, at a first layer, a sensor data response message that comprises a first indication of the token identifier and a sensor data payload, configuring, at a second layer, a second indication of the token identifier to the sensor data response message, wherein the second layer is a physical layer that is a lower layer than the first layer, and transmitting the sensor data response message to the requesting device.

An apparatus for wireless communication is described. The apparatus may include means for receiving a sensor data request message from a requesting device, the sensor data request message comprising a token identifier associated with the sensor data request message, means for configuring, at a first layer, a sensor data response message that comprises a first indication of the token identifier and a sensor data payload, means for configuring, at a second layer, a second indication of the token identifier to the sensor data response message, wherein the second layer is a physical layer that is a lower layer than the first layer, and means for transmitting the sensor data response message to the requesting device.

Another apparatus for wireless communication is described. The apparatus may include a processor, memory in electronic communication with the processor, and instructions stored in the memory. The instructions may be operable to cause the processor to receive a sensor data request message from a requesting device, the sensor data request message comprising a token identifier associated with the sensor data request message, configure, at a first layer, a sensor data response message that comprises a first indication of the token identifier and a sensor data payload, configure, at a second layer, a second indication of the token identifier to the sensor data response message, wherein the second layer is a physical layer that is a lower layer than the first layer, and transmit the sensor data response message to the requesting device.

A non-transitory computer readable medium for wireless communication is described. The non-transitory computer-readable medium may include instructions operable to cause a processor to receive a sensor data request message from a requesting device, the sensor data request message comprising a token identifier associated with the sensor data request message, configure, at a first layer, a sensor data response message that comprises a first indication of the token identifier and a sensor data payload, configure, at a second layer, a second indication of the token identifier to the sensor data response message, wherein the second layer is a physical layer that is a lower layer than the first layer, and transmit the sensor data response message to the requesting device.

Some examples of the method, apparatus, and non-transitory computer-readable medium described above may further include processes, features, means, or instructions for receiving a first feedback message from the requesting device, the first feedback message received responsive to the second indication of the token identifier being detected at the second layer.

In some examples of the method, apparatus, and non-transitory computer-readable medium described above, the first feedback message comprises an indication of the token identifier.

Some examples of the method, apparatus, and non-transitory computer-readable medium described above may further include processes, features, means, or instructions for identifying a mapping between the received sensor data response message and a first feedback message, wherein the first feedback message may be received according to the mapping.

In some examples of the method, apparatus, and non-transitory computer-readable medium described above, the mapping comprises the sensor data response message may be transmitted on a control channel and the first feedback message may be received on a feedback channel associated with sensor data.

Some examples of the method, apparatus, and non-transitory computer-readable medium described above may further include processes, features, means, or instructions for receiving a second feedback message from the requesting device, the second feedback message received responsive to decoding the sensor data payload and the first indication of the token identifier being detected at the first layer.

Some examples of the method, apparatus, and non-transitory computer-readable medium described above may further include processes, features, means, or instructions for failing to receive a feedback message from the requesting device. Some examples of the method, apparatus, and non-transitory computer-readable medium described above may further include processes, features, means, or instructions for retransmitting the sensor data response message.

Some examples of the method, apparatus, and non-transitory computer-readable medium described above may further include processes, features, means, or instructions for identifying a plurality of token identifiers, each of the plurality of token identifiers associated with a corresponding sensor data request message. Some examples of the method, apparatus, and non-transitory computer-readable medium described above may further include processes, features, means, or instructions for configuring a portion of the sensor data response message having the token identifier associated with the received sensor data request message.

Some examples of the method, apparatus, and non-transitory computer-readable medium described above may further include processes, features, means, or instructions for identifying a subframe mapping configuration associated with configuring the second indication of the token identifier at the second layer, wherein a first feedback message may be received in a subframe according to the subframe mapping configuration.

In some examples of the method, apparatus, and non-transitory computer-readable medium described above, the subframe mapping configuration comprises receiving the first feedback message in the same subframe as the sensor data response message may be transmitted in.

In some examples of the method, apparatus, and non-transitory computer-readable medium described above, the subframe mapping configuration comprises receiving the first feedback message in a different subframe from the subframe that the sensor data response message may be transmitted in.

DETAILED DESCRIPTION

Figure 1:
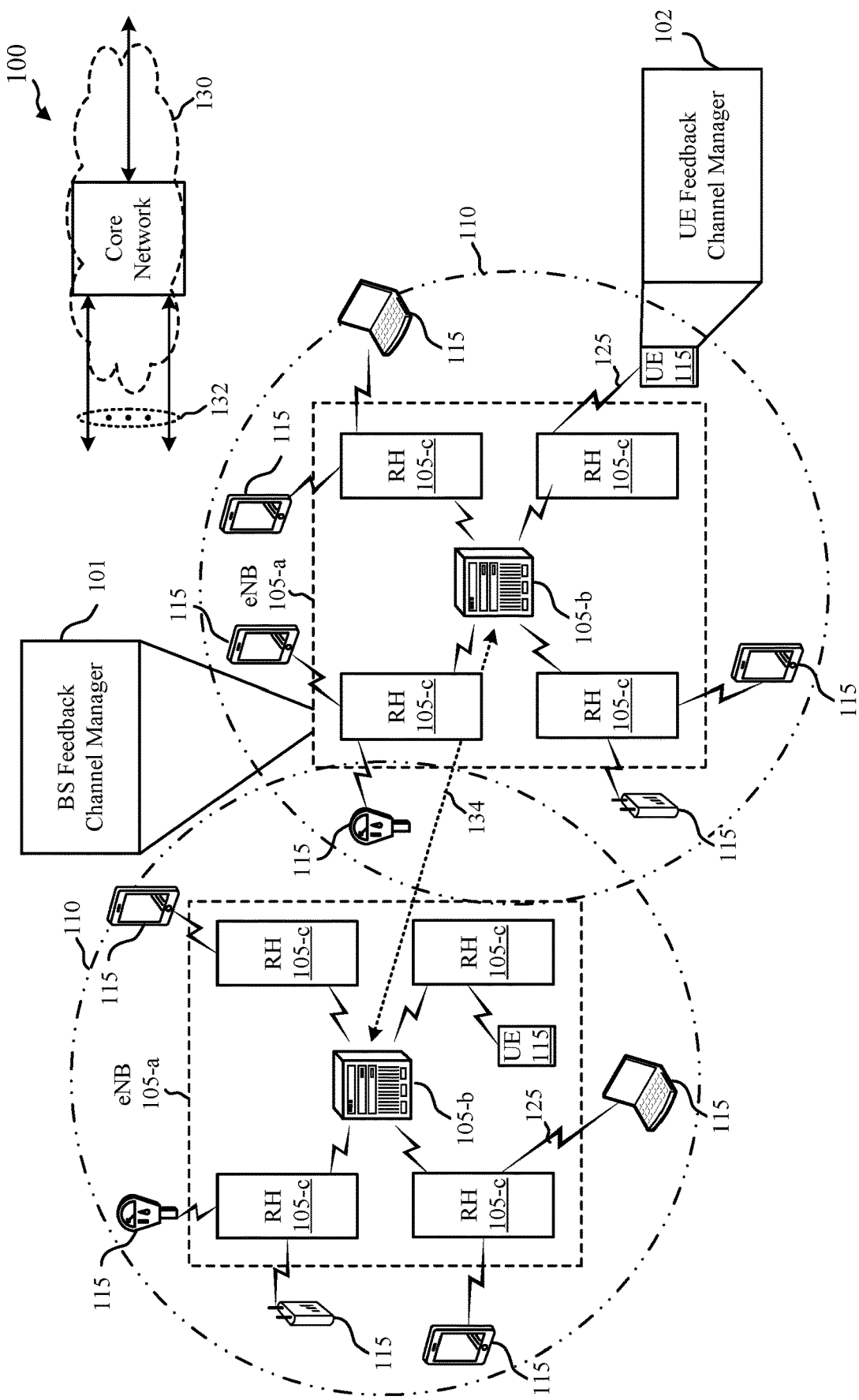
FIG. 1 illustrates an example of a system for wireless communication that supports V2X feedback channel design in accordance with aspects of the present disclosure.

Certain wireless communication systems may be used to communicate data that is associated with high reliability and low latency. One non-limiting example of such data includes V2X and/or V2V communications. For example, self-driving cars are an exciting area of innovation that will rely on wireless communications. For example, sensors used for self-driving cars may use some sensors, e.g. Lidar, radar, cameras etc., that are line of sight sensors. V2V communication, however, may use line of sight and non-line of sight communications. This can be particularly helpful for the case where two vehicles are approaching intersections. V2V communication can be used to share sensor information between the approaching vehicles. This and other communication scenarios raise certain considerations. For example, for a particular location or geographical area there may be several vehicles sensing the same information such as an obstacle or a pedestrian. This raises the question of which vehicle should broadcast such information (e.g., sensor data). If all vehicles transmit such information, this can be an inefficient use of resources and may, in some examples, result in collisions of the wireless transmissions and loss of data. This may also lead to more serious collisions.

Aspects of the disclosure are initially described in the context of a wireless communications system. For example, the described techniques may provide for linkage between feedback messages from a requesting device and a responding device that improves reliability, reduces latency, and overall improves wireless communications. Broadly, the described techniques provide for use of a token identifier (ID) to be used or otherwise associated with a request for data between the requesting and responding devices. The token ID may be included in an upper layer (e.g., encoded in an Internet Protocol (IP) sublayer) and a lower layer (e.g., a physical layer) such that an initial feedback message can be provided quickly. For example, a requesting wireless device may transmit a sensor data request message to a responding device that includes the token ID, e.g., the token ID may be encoded in an upper layer of the request message. The responding device can respond with a sensor data response message that includes two instances of the token ID. The first instance may be configured at an upper layer (e.g., the IP sublayer) and the second instance may be configured at a lower layer, e.g., a physical layer. The requesting device may receive the response message, detect the token ID at the lower layer and immediately send a first feedback message. The requesting device may subsequently decode the response message at the upper layer (e.g., IP sublayer) to detect the second instance of the token ID and send a second feedback message. The first response message will therefore be transmitted more quickly than the second response message and may also be linked to a feedback channel such that the responding device knows where to look for the first feedback message.

Aspects of the disclosure are further illustrated by and described with reference to apparatus diagrams, system diagrams, and flowcharts that relate to V2X feedback channel design.

FIG. 1 illustrates an example of a wireless communications system 100, in accordance with one or more aspects of the present disclosure. The wireless communication system 100 may include network devices 105, UEs 115, and a core network 130. In some examples, the wireless communication system 100 may be a LTE (or LTE-Advanced) network, or a NR network. In some cases, wireless communication system 100 may support enhanced broadband communications, ultra-reliable (i.e., mission critical) communications, low latency communications, and communications with low-cost and low-complexity devices.

The core network 130 may provide user authentication, access authorization, tracking, IP connectivity, and other access, routing, or mobility functions. At least some of the network devices 105 (e.g., network device 105-a, which may be an example of an evolved node B (eNB) or a base station, or network device 105-b, which may be an example of an access node controller (ANC)) may interface with the core network 130 through backhaul links 132 (e.g., S1, S2, etc.) and may perform radio configuration and scheduling for communication with the UEs 115. In various examples, the network devices 105-b may communicate, either directly or indirectly (e.g., through core network 130), with each other over backhaul links 134 (e.g., X1, X2, etc.), which may be wired or wireless communication links.

Each network device 105-b may also communicate with a number of UEs 115 through a number of other network devices 105-c, where network device 105-c may be an example of a smart radio head. In alternative configurations, various functions of each network device 105 may be distributed across various network devices 105 (e.g., radio heads and access network controllers) or consolidated into a single network device 105 (e.g., a base station).

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid Automatic Repeat Request (HARD) to provide retransmission at the MAC layer to improve link efficiency. In the control plane, the Radio Resource Control (RRC) protocol layer may provide establishment, configuration, and maintenance of an RRC connection between a UE 115 and a network device 105-c, network device 105-b, or core network 130 supporting radio bearers for user plane data. At the Physical (PHY) layer, transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, a wireless node, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, an Internet of things (IoT) device, an Internet of Everything (IoE) device, a machine type communication (MTC) device, an appliance, an automobile, or the like. A UE 115 may be able to communicate with various types of network devices 105-a, network devices 105-c, base stations, access points, or other network devices, including macro eNBs, small cell eNBs, relay base stations, and the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a network device 105. In some cases, groups of UEs 115 communicating via D2D communications may utilize a one-to-many (1:M) system in which each UE 115 transmits to every other UE 115 in the group. In some cases, a network device 105 facilitates the scheduling of resources for D2D communications. In other cases, D2D communications are carried out independent of a core network 105. Another example of direct UE 115 communications may include V2X and/or V2V communications.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

In some aspects, the described techniques refer to a requesting device and a responding device. The requesting device may refer to a UE 115 and/or a network device 105 (also referred to as a base station) when configured or otherwise acting as a device requesting data from a responding device. The responding device may refer to a UE 115 and/or a network device 105 when configured or otherwise acting as a device providing the data to the requesting device.

The communication links 125 shown in wireless communication system 100 may include uplink (UL) channels from a UE 115 to a network device 105-c, and/or downlink (DL) channels, from a network device 105-c to a UE 115. The DL channels may also be called forward link channels, while the UL channels may also be called reverse link channels. Control information and data may be multiplexed on an UL channel or DL according to various techniques. Control information and data may be multiplexed on a DL channel, for example, using time-division multiplexing (TDM) techniques, frequency-division multiplexing (FDM) techniques, or hybrid TDM-FDM techniques. In some examples, the control information transmitted during a transmit time interval (TTI) of a DL channel may be distributed between different control regions in a cascaded manner (e.g., between a common control region and one or more UE-specific control regions).

Wireless communication system 100 may operate in an ultra high frequency (UHF) frequency region using frequency bands from 700 MHz to 2600 MHz (2.6 GHz), although in some cases WLAN networks may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communication system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communication system 100 may support millimeter wave (mmW) communications between UEs 115 and network devices 105. Devices operating in mmW or EHF bands may have multiple antennas to allow beamforming. That is, a network device 105 may use multiple antennas or antenna arrays to conduct beamforming operations for directional communications with a UE 115. Beamforming (which may also be referred to as spatial filtering or directional transmission) is a signal processing technique that may be used at a transmitter (e.g. a network device 105) to shape and/or steer an overall antenna beam in the direction of a target receiver (e.g. a UE 115). This may be achieved by combining elements in an antenna array in such a way that transmitted signals at particular angles experience constructive interference while others experience destructive interference.

In some cases, wireless communication system 100 may utilize both licensed and unlicensed radio frequency spectrum bands. For example, wireless communication system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as network devices 105 and UEs 115 may employ listen-before-talk (LBT) procedures to ensure the channel is clear before transmitting data. In some cases, operations in unlicensed bands may be based on a carrier aggregation (CA) configuration in conjunction with component carriers (CCs) operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

Wireless communication system 100 may include or support networks used for vehicle based communications, also referred to as V2X, V2V networks, and/or C-V2X networks. Vehicle based communication networks may provide always on telematics where UEs, e.g., v-UEs, communicate to V2N, to V2P UEs, to V2I, and to other v-UEs (e.g., via the network). The vehicle based communication networks may support a safe, always-connected driving experience by providing intelligent connectivity where traffic signal/timing, real-time traffic and routing, safety alerts to pedestrians/bicyclist, collision avoidance information, etc., are exchanged.

One or more of network devices 105 may include a base station (BS) feedback channel manager 101. One or more of the UEs 115 may include a UE feedback channel manager 102. The BS feedback channel manager 101 and/or the UE feedback channel manager 102 may perform similar functions when the associated device is operating as a requesting device and/or as a responding device. For example when the network device 105 and/or UE 115 is acting as a requesting device, the feedback channel managers 101 and/or 102 may transmit a sensor data request message to a responding device. The request message may include the token ID, or an indication of the token ID, that is associated with the request message. The feedback channel managers 101 and/or 102 may receive a sensor data response message from the responding device. The response message may include two indication of the token ID, a first at a physical layer and a second at an upper layer. The feedback channel managers 101 and/or 102 may transmit a first feedback message in response to detecting the token ID indication in the physical layer.

As another example when the network device 105 and/or UE 115 is acting as a responding device, the feedback channel managers 101 and/or 102 may receive the sensor data request message from the requesting device, the request message including the token ID. The feedback channel managers 101 and/or 102 may configure the sensor data response message to include the first and second indications of the token ID, e.g., at the physical and upper layers. The feedback channel managers 101 and/or 102 may transmit the sensor data response message to the requesting device.

Figure 2:
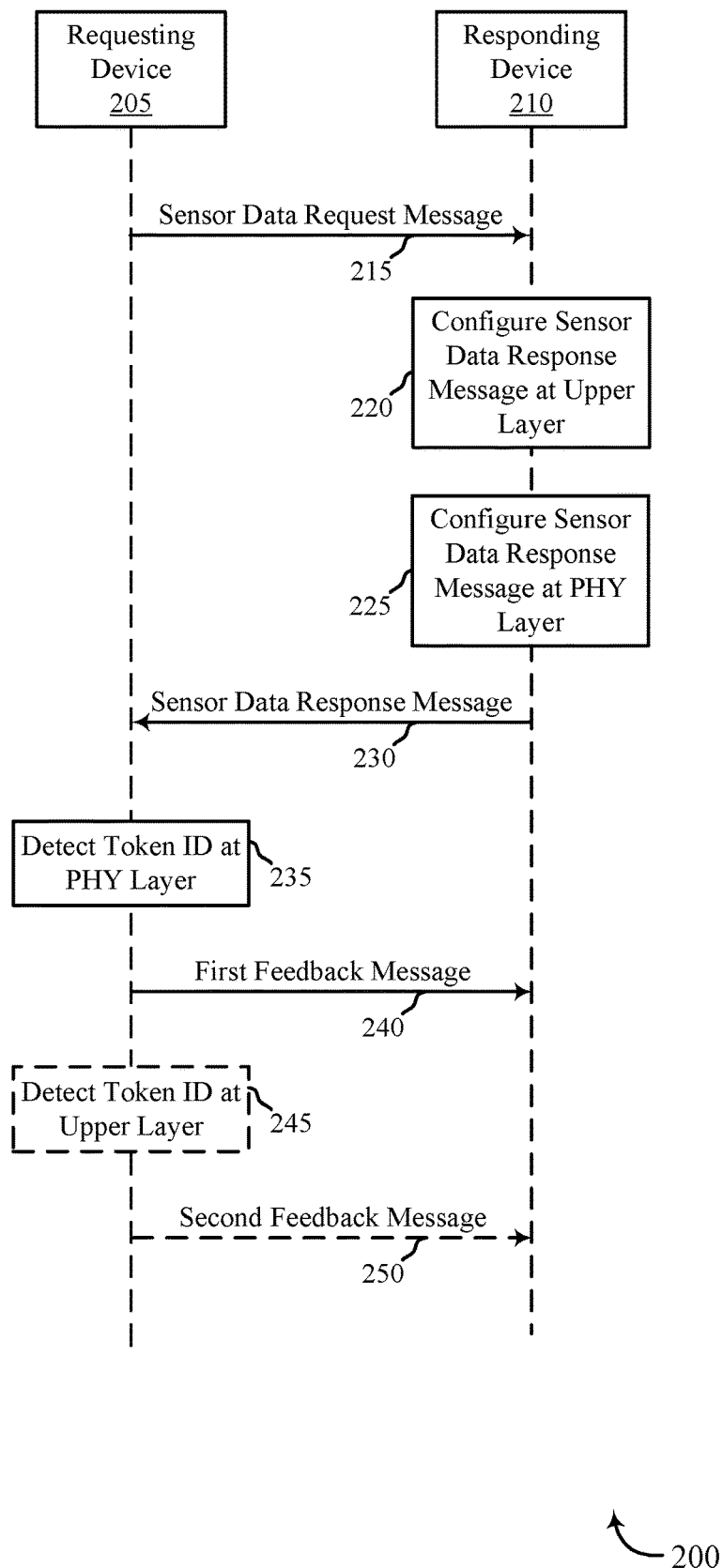
FIG. 2 illustrates an example of a process that supports V2X feedback channel design, in accordance with one or more aspects of the present disclosure.

FIG. 2 illustrates an example of a process 200 for V2X feedback channel design, in accordance with one or more aspects of the present disclosure. Process 200 may implement aspect(s) of wireless communication system 100 of FIG. 1. Process 200 may include a requesting device 205 and a responding device 210. Requesting device 205 and/or responding device 210 can be either a UE 105 or a network device 105 (e.g., a base station), as described herein.

Generally, process 200 illustrates an example of linkage between a response message from responding device 210 and a feedback message from requesting device 205. For example, the described techniques provide for linkage so that requestor device 205 can send feedback message for corresponding response message at the physical layer, even though the request/response information are typically conveyed at an upper layer, e.g., an IP layer. Broadly, the upper layer of the request message may include a token ID associated with the request message. The response message may include two indications of the token ID, e.g., a first indication in an upper layer and a second indication at a physical layer. The requesting device 205 receives the response message, detects the token ID at the physical layer, and sends a first feedback message based on the detection, e.g., before successfully decoding the upper layer information containing the requested sensor data and the second indication of the token ID.

At 215, requesting device 205 may transmit a sensor data request message to responding device 210. The sensor data request message may include a token ID that is associated with the sensor data request message. For example, the token ID may be encoded in an upper layer of the sensor data request message (e.g., in layer 2 (L2) or layer 3 (L3)). The token ID may be a randomly generated number that is used to connect, tie, or otherwise associate a sensor data response message to the sensor data request message. In some aspects, the token ID may be based on such factors as an identifier of the requesting device 205, on a type of sensor data being requested, on a time parameter, etc.

The sensor data request message may include other information such as an identifier of the requesting device 205, a time stamp, a priority indicator associated with the sensor data, and the like. Moreover, the sensor data request message may also include information associated with the sensor data being requested, e.g., what type of sensor data has been requested (e.g., Lidar, camera, etc.) obstacle location/identification, traffic speed, geographic location information, and the like.

In some aspects, the sensor data request message may identify the responding device 210 that the requesting device 205 is requesting the sensor data from. In such an example, the sensor data request message may also carry identifier information for the responding device 210. Also in such an example, the sensor data request message may be a broadcast message or a unicast message.

In other aspects, the requesting device may not know or care which responding device provides the sensor data. Accordingly, in this example the sensor data request message may be a broadcast message that is received by a plurality of devices, where responding device 210 has the requested sensor data and is able to respond. In this example, the sensor data request message may not identify any particular responding device. Regardless of whether the sensor data request message is a unicast or broadcast message, the responding device 210 receives the sensor data request message at 215.

At 220, responding device 210 may configure the sensor data response message at an upper layer that includes a first indication of the token ID. For example, the responding device 210 may encode the requested sensor data at an upper layer (e.g., L2 or L3) and also includes an indication of the token ID.

In some aspects, the token ID may be encoded with the requested sensor data at the upper layer. In such an example, the upper layer may be L3 (e.g., an IP layer) associated with user traffic. In other aspects, the token ID may encoded or otherwise conveyed separately from the requested sensor data in the upper layer. For example, the requested sensor data may be encoded in L3 (e.g., in the IP layer) whereas the token ID is included in L2 (e.g., header information added at the PDCP layer, included in a transport block at the MAC layer, etc.).

At 225, responding device 210 may configure the sensor data response message at a lower layer, e.g., the physical layer, to include or otherwise convey the token ID. For example, the responding device 210 may configure physical signals that are used exclusively by the physical layer to convey the indication of the token ID. In some aspects, the token ID is configured to be conveyed in one or more control channels of the physical layer, e.g., a control channel such as NR physical sidelink control channel (NR PSCCH).

In some aspects, the sensor data response message may be conveyed in more than one channel. For example, scheduling information portions of the sensor data response message may be conveyed in a control channel (e.g., NR PSCCH) and the sensor data payload may be conveyed in a data channel (e.g., a physical sidelink shared channel (PSSCH)). In this example, the upper layer indication of the token ID may be conveyed in or with the sensor data payload in the data channel and the physical layer indication of the token ID may be conveyed at the physical layer in the control channel.

At 230, responding device 210 may transmit the sensor data response message to requesting device 205. As discussed, the portion of the sensor data response message conveying the indication of the token ID at the physical layer may transmitted in NR PSCCH and the portion of the sensor data response message carrying the second indication of the token ID (along with the requested sensor data) at the upper layer may be transmitted in the PSSCH.

At 235, requesting device 205 may detect the token ID at the lower layer, e.g., the physical layer. For example, requesting device 205 may receive the sensor data response message that includes the first and second indications of the token ID at the physical and upper layers, respectively. Requesting device 205 may detect the first indication of the token ID at the physical layer by detecting one or more physical signals in the PSCCH and/or by decoding one or more bits of information at the PSCCH conveying the token ID. Requesting device 205 may confirm that the detected token ID is the same token ID as is transmitted in the sensor data request message.

In some aspects, the sensor data response message may include more than one token ID (e.g., the responding device 210 may be providing sensor data to other devices). The multiple token IDs may be CDM together in the same physical resource or the position (e.g., the resource block) may be hashed based on the token ID.

In some aspects, feedback messages may have a length of one sub-channel. In some aspects, the feedback messages may have a length that corresponds to the data channel. In some aspects, the control channel may be limited so the control channel MAC header may carry the first indication of the token ID. This may support requesting devices 205 searching for the sensor data to respond in the corresponding feedback channel.

At 240, requesting device 205 may transmit a first feedback message to responding device 210 in response to detecting the first indication of the token ID at the physical layer. The first feedback message may be an acknowledgement/negative acknowledgement (ACK/NACK) message that indicates successful receipt of the token ID at the physical layer (e.g., an ACK message). Thus, while requesting device 205 has detected the token ID associated with the sensor data request message at the physical layer in the control channel portion of the sensor data response message, requesting device 205 transmits the first feedback message before the actual sensor data payload information has been successfully decoded. This may provide an initial indication of successful receipt of the sensor data response message to responding device 210 and, therefore, provide increased reliability and decreased latency for providing the requested sensor data. The first feedback message may include an indication of the token ID.

In some aspects, the first feedback message may be transmitted using a dedicated feedback channel, such as a physical sidelink HARQ indicator channel (PSHICH). There may be a mapping between the control channel used to convey the token ID at the physical layer and the feedback channel such that responding device 210 knows (e.g., based on when/where the sensor data response message was transmitted) when/where in the feedback channel to look for the first feedback message. In some examples, the first feedback channel may be transmitted in the same subframe as the token ID in the control channel is received (e.g., K=0) or in a subsequent subframe (e.g., K=1, K=2, etc.).

In some aspects, if the requesting device 205 does not detect the first indication of the token ID at a physical layer in the control channel, the first feedback message may be a NACK message. This may be associated with an instance where requesting device 205 knows which device will be responding device and when the sensor data response message is expected.

At 245, requesting device 205 may optionally detect the token ID at the upper layer. For example, requesting device 205 may successfully decode the sensor data payload encoded in the upper layers of the sensor data response message and detect the second indication of the token ID. Requesting device 205 may confirm that the detected token ID is the same token ID as is transmitted in the sensor data request message.

At 250, requesting device 205 may optionally transmit a second feedback message to responding device 210. The second feedback message may be an ACK message provided the sensor data payload has been successfully decoded and the second indication of the token ID in the upper layer matches the token ID conveyed in the sensor data request message. The second feedback message may be transmitted in a feedback channel, e.g., the PSHICH. In some aspects, the second feedback message may be transmitted in a subframe that follows the subframe in which the sensor data response message is received in.

Figure 3:
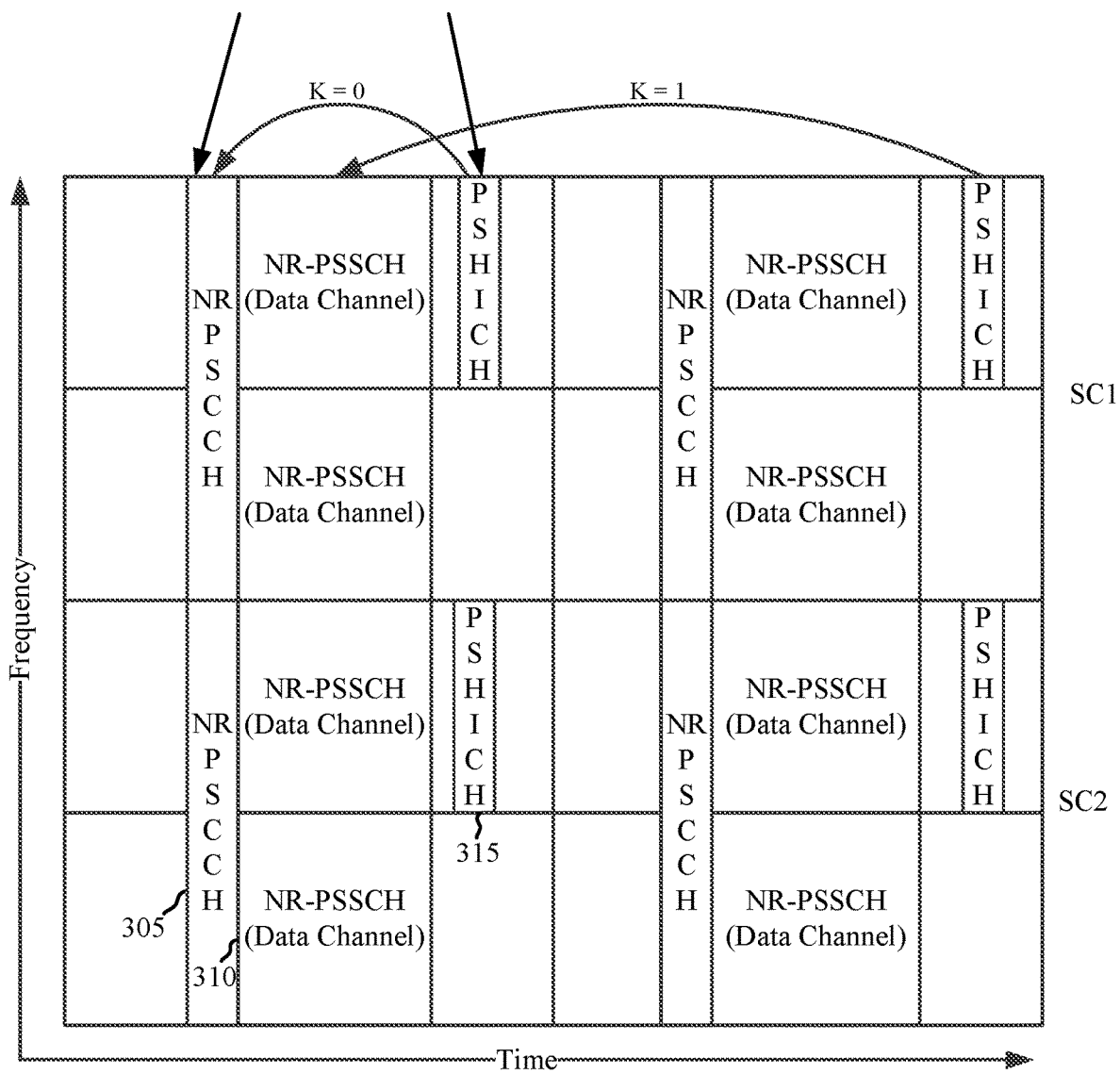
FIG. 3 illustrates an example of a channel configuration that supports V2X feedback channel design, in accordance with one or more aspects of the present disclosure.

FIG. 3 illustrates an example of a channel configuration 300 for V2X feedback channel design, in accordance with one or more aspects of the present disclosure. Channel configuration 300 may implement (or be implemented by) wireless communication system 100 and/or process 200 of FIGS. 1 and 2. For example, a requesting device and/or a receiving device may implement aspect(s) of channel configuration 300 for use in communicating sensor data between the devices.

Channel configuration 300 illustrates one example of a channel configuration that includes a mapping between the control channel and feedback channel. For example, channel configuration 300 illustrates a channel configuration including two sub-channels (SC1 and SC2) that span two subframes. Channel configuration 300 is not limited to two sub-channels and/or two subframes but may instead more or less than two sub-channels and more or less than two subframes.

Each subframe of a sub-channel may include a control channel 305 (e.g., NR PSCCH), a data channel 310 (e.g., NR PSSCH), each data channel 310 spans multiple (or each) frequency component of the sub-channel, and a feedback channel 315. One or more subframes of a sub-channel may include other channels (not shown), such as LBT channels, uplink burst channels, etc. Channel configuration 300 illustrates two subframes of the first sub-channel and the second sub-channel.

As previously discussed, there may be a mapping between the control channel 305 and the corresponding feedback channel 315. In the channel configuration 300, the mapping may include a control channel 305 in a subframe of a sub-channel being mapped to the corresponding feedback channel 315 in the subframe of the sub-channel (e.g., K=0) or to a subsequent subframe of the sub-channel (e.g., K=1). Thus, a requesting device that detects the token ID in the sensor data response message and in the control channel 305 may know, a priori, to transmit the first feedback message in the feedback channel of that subframe. Moreover, the responding device may also know to look for the first feedback message in the feedback channel 315 of the subframe (or subsequent subframe) that the sensor data response message was transmitted.

The data channel 310 may carry the requested sensor data payload along with the second indication of the token ID in the upper layer.

Figure 4:
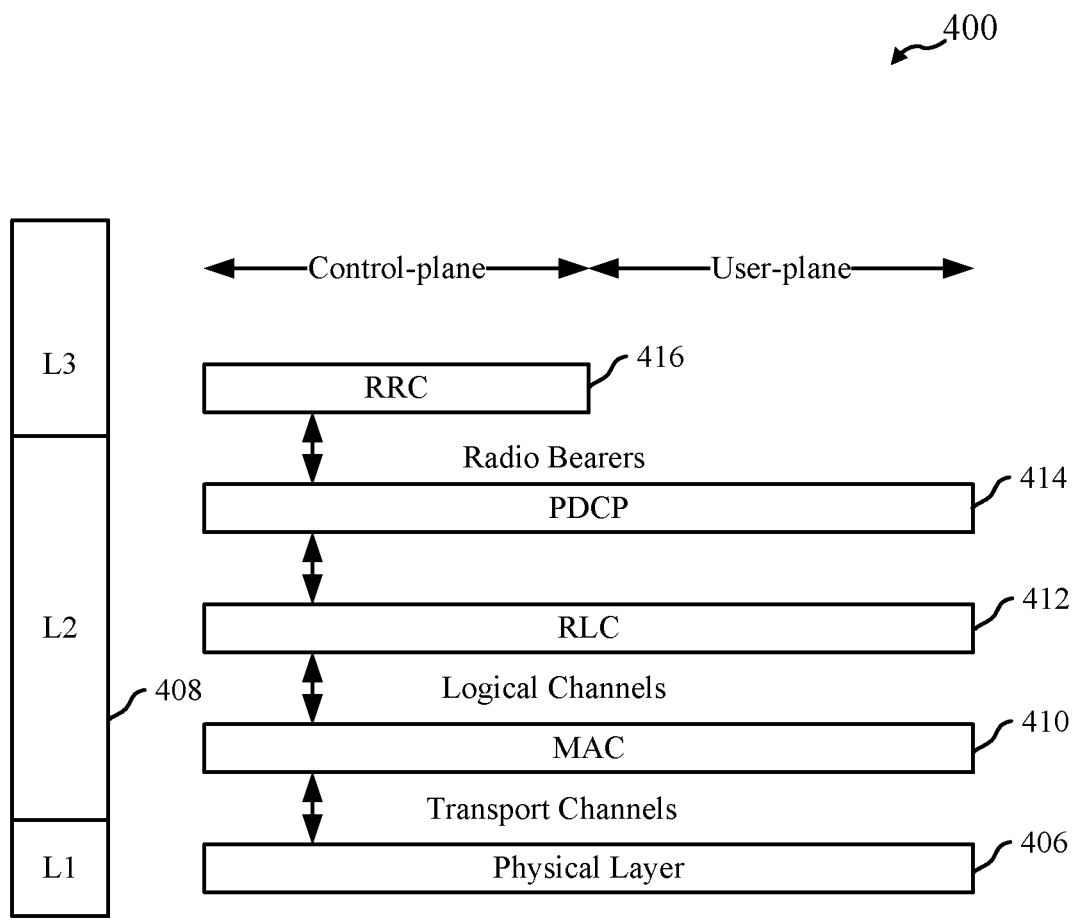
FIG. 4 illustrates an example of a radio protocol architecture that supports V2X feedback channel design, in accordance with one or more aspects of the present disclosure.

FIG. 4 illustrates an example of a radio protocol architecture 400 for V2X feedback channel design, in accordance with one or more aspects of the present disclosure. The radio protocol architecture 400 for the UE and the network device (or base station) is shown with three layers: Layer 1, Layer 2, and Layer 3. Layer 1 (L1 layer) is the lowest layer and implements various physical layer signal processing functions. The L1 layer will be referred to herein as the physical layer 406. L2 layer 408 is above the physical layer 406 and is responsible for the link between the UE and network device (or base station) over the physical layer 406.

In the user plane, the L2 layer 408 includes a MAC sublayer 410, a RLC sublayer 412, and a PDCP 414 sublayer, which are terminated at the network device on the network side. Although not shown, the UE may have several upper layers above the L2 layer 408 including a network layer (e.g., IP layer) that may be terminated at a packet data network (PDN) gateway on the network side, and an application layer that is terminated at the other end of the connection (e.g., far end UE, server, etc.).

The PDCP sublayer 414 provides multiplexing between different radio bearers and logical channels. The PDCP sublayer 414 also provides header compression for upper layer data packets to reduce radio transmission overhead, security by ciphering the data packets, and handover support for UEs between network devices. The RLC sublayer 412 provides segmentation and reassembly of upper layer data packets, retransmission of lost data packets, and reordering of data packets to compensate for out-of-order reception due to HARQ. The RLC sublayer 412 passes data to the MAC sub layer 410 as logical channels.

Logical control channels may include a broadcast control channel (BCCH), which is the downlink channel for broadcasting system control information, a paging control channel (PCCH), which is the downlink channel that transfers paging information, a multicast control channel (MCCH), which is a point-to-multipoint downlink channel used for transmitting multimedia broadcast and multicast service (MBMS) scheduling and control information for one or several multicast traffic channels (MTCHs). Generally, after establishing RRC connection, MCCH is only used by the UEs that receive MBMS. Dedicated control channel (DCCH) is another logical control channel that is a point-to-point bi-directional channel transmitting dedicated control information, such as user-specific control information used by the user equipment having an RRC connection. Common control channel (CCCH) is also a logical control channel that may be used for random access information. Logical traffic channels may comprise a dedicated traffic channel (DTCH), which is a point-to-point bi-directional channel dedicated to one user equipment for the transfer of user information. Also, a MTCH may be used for point-to-multipoint downlink transmission of traffic data. Additional channels may include the control channel 305, data channel 310, and/or feedback channels 315 described with reference to FIG. 3.

The MAC sublayer 410 provides multiplexing between logical and transport channels. The MAC sublayer 410 is also responsible for allocating the various radio resources (e.g., resource blocks) in one cell among the UEs. The MAC sublayer 410 is also responsible for HARQ operations. The MAC layer formats and sends the logical channel data to the physical layer 406 as transport channels.

The DL transport channels may include a broadcast channel (BCH), a downlink shared data channel (DL-SCH), a multicast channel (MCH) and a Paging Channel (PCH). The UL transport channels may include a random access channel (RACH), a request channel (REQCH), an uplink shared data channel (UL-SDCH) and a plurality of physical channels. The physical channels may also include a set of downlink and uplink channels. In some disclosed aspects, the downlink physical channels may include at least one of a common pilot channel (CPICH), a synchronization channel (SCH), a CCCH, a shared downlink control channel (SDCCH), a MCCH, a shared uplink assignment channel (SUACH), an acknowledgement channel (ACKCH), a downlink physical shared data channel (DL-PSDCH), an uplink power control channel (UPCCH), a paging indicator channel (PICH), a load indicator channel (LICH), a physical broadcast channel (PBCH), a physical control format indicator channel (PCFICH), a physical downlink control channel (PDCCH), a physical hybrid ARQ indicator channel (PHICH), a physical downlink shared channel (PDSCH) and a physical multicast channel (PMCH). The uplink physical channels may include at least one of a physical random access channel (PRACH), a channel quality indicator channel (CQICH), an ACKCH, an antenna subset indicator channel (ASICH), a shared request channel (SREQCH), an uplink physical shared data channel (UL-PSDCH), a broadband pilot channel (BPICH), a physical uplink control channel (PUCCH) and a physical uplink shared channel (PUSCH).

In the control plane, the radio protocol architecture for the UE and network device is substantially the same for the physical layer 406 and the L2 layer 408 with the exception that there is no header compression function for the control plane. The control plane also includes a RRC sublayer 416 in L3 layer. The RRC sublayer 416 is responsible for obtaining radio resources (i.e., radio bearers) and for configuring the lower layers using RRC signaling between the network device and the UE.

As discussed, the responding device may configure a first indication of the token ID at a physical layer of the sensor data response message and a second indication of the token ID at an upper layer of the sensor data response message. Broadly, the upper layer may include any sublayer of the L2 or L3 layers. In one non-limiting example, the sensor data payload and second indication of the token ID may be conveyed in the IP sublayer.

Figure 5:
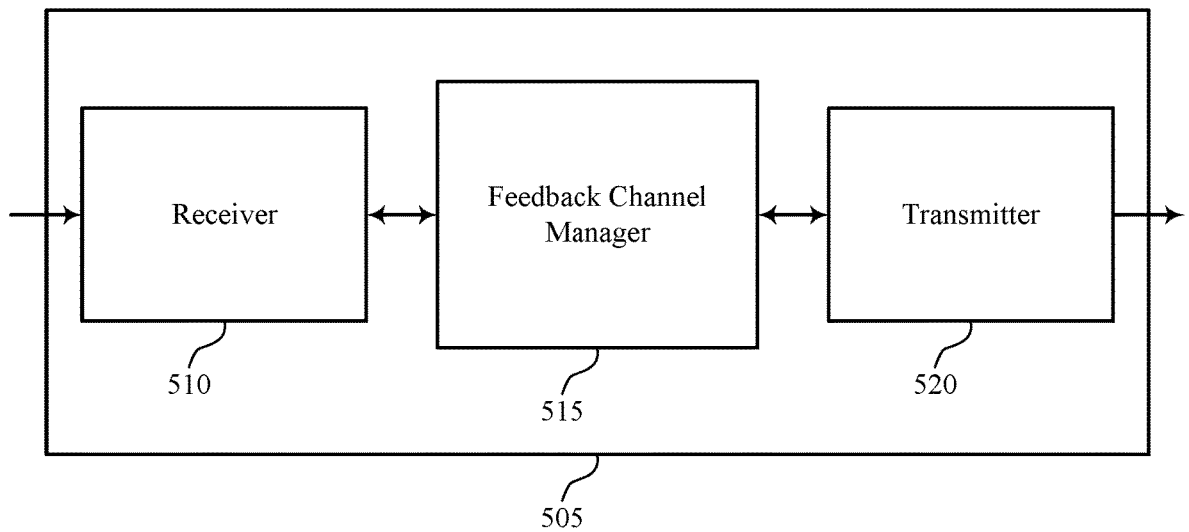
FIGS. 5 through 7 show block diagrams of a device that supports V2X feedback channel design, in accordance with one or more aspects of the present disclosure.

FIG. 5 shows a block diagram 500 of a wireless device 505 that supports V2X feedback channel design, in accordance with one or more aspects of the present disclosure. Wireless device 505 may be an example of aspects of a UE 115, a requesting device, a responding device, or network device 105 as described with reference to FIGS. 1 through 4. Wireless device 505 may include a receiver 510, a feedback channel manager 515, and a transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to V2X feedback channel design, etc.). Information may be passed on to other components of the device. The receiver 510 may be an example of aspects of the transceiver 835 described with reference to FIG. 8.

Feedback channel manager 515 may be an example of aspects of the feedback channel manager 815 described with reference to FIG. 8.

Feedback channel manager 515 and/or at least some of its various sub-components may be implemented in hardware, software executed by a processor, firmware, or any combination thereof. If implemented in software executed by a processor, the functions of the feedback channel manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The feedback channel manager 515 and/or at least some of its various sub-components may be physically located at various positions, including being distributed such that portions of functions are implemented at different physical locations by one or more physical devices. In some examples, feedback channel manager 515 and/or at least some of its various sub-components may be a separate and distinct component in accordance with various aspects of the present disclosure. In other examples, feedback channel manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

When configured as a requesting device, feedback channel manager 515 may transmit a sensor data request message to a responding device, the sensor data request message including a token identifier associated with the sensor data request message. Feedback channel manager 515 may receive, from the responding device, a sensor data response message, the sensor data response message including a first indication of the token identifier at a first layer and a second indication of the token identifier at a second layer, where the first layer is a physical layer that is a lower layer than the second layer. Feedback channel manager 515 may transmit a first feedback message responsive to detecting the first indication of the token identifier at the first layer.

When configured as a responding device, the feedback channel manager 515 may receive a sensor data request message from a requesting device, the sensor data request message including a token identifier associated with the sensor data request message. Feedback channel manager 515 may configure, at a first layer, a sensor data response message that includes a first indication of the token identifier and a sensor data payload. Feedback channel manager 515 may configure, at a second layer, a second indication of the token identifier to the sensor data response message, where the second layer is a physical layer that is a lower layer than the first layer. Feedback channel manager 515 may transmit the sensor data response message to the requesting device.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may include a single antenna, or it may include a set of antennas.

Figure 6:
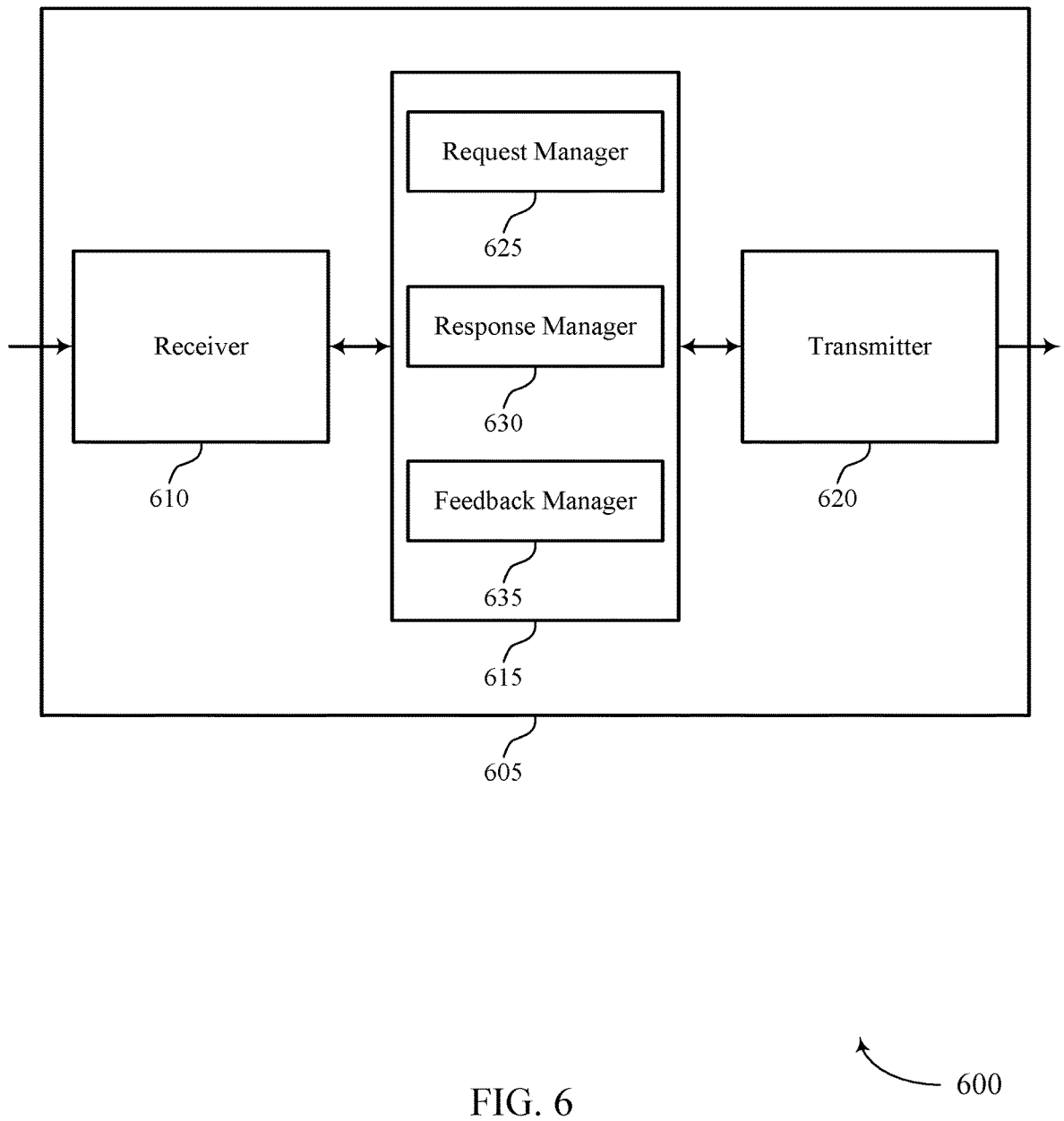

FIG. 6 shows a block diagram 600 of a wireless device 605 that supports V2X feedback channel design, in accordance with one or more aspects of the present disclosure. Wireless device 605 may be an example of aspects of a wireless device 505, a requesting device, a responding device, a UE 115, or a network device 105 as described with reference to FIGS. 1 through 5. Wireless device 605 may include a receiver 610, a feedback channel manager 615, and a transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to V2X feedback channel design, etc.). Information may be passed on to other components of the device. The receiver 610 may be an example of aspects of the transceiver 835 described with reference to FIG. 8.

Feedback channel manager 615 may be an example of aspects of the feedback channel manager 815 described with reference to FIG. 8. Feedback channel manager 615 may also include a request manager 625, a response manager 630, and a feedback manager 635.

Request manager 625 may transmit a sensor data request message to a responding device, the sensor data request message including a token identifier associated with the sensor data request message. Request manager 625 may receive a sensor data request message from a requesting device, the sensor data request message including a token identifier associated with the sensor data request message.

Response manager 630 may receive, from the responding device, a sensor data response message, the sensor data response message including a first indication of the token identifier at a first layer and a second indication of the token identifier at a second layer, where the first layer is a physical layer that is a lower layer than the second layer. Response manager 630 may determine that the sensor data response message includes a set of token identifiers, each of the set of token identifiers associated with a corresponding sensor data request message. Response manager 630 may identify a portion of the sensor data response message having the token identifier associated with the transmitted sensor data request message. Response manager 630 may configure, at a first layer, a sensor data response message that includes a first indication of the token identifier and a sensor data payload. Response manager 630 may configure, at a second layer, a second indication of the token identifier to the sensor data response message, where the second layer is a physical layer that is a lower layer than the first layer. Response manager 630 may transmit the sensor data response message to the requesting device. Response manager 630 may identify a set of token identifiers, each of the set of token identifiers associated with a corresponding sensor data request message. Response manager 630 may configure a portion of the sensor data response message having the token identifier associated with the received sensor data request message.

Feedback manager 635 may transmit a first feedback message responsive to detecting the first indication of the token identifier at the first layer. Feedback manager 635 may transmit a second feedback message responsive to successful decoding the sensor data response message by the second layer and detecting the second indication of the token identifier at the second layer. Feedback manager 635 may determine that the first indication is undetected at the first layer. Feedback manager 635 may refrain from transmitting the first feedback message based on the determining or transmitting the first feedback message that indicates the first indication was undetected at the first layer. Feedback manager 635 may receive a first feedback message from the requesting device, the first feedback message received responsive to the second indication of the token identifier being detected at the second layer. Feedback manager 635 may receive a second feedback message from the requesting device, the second feedback message received responsive to decoding the sensor data payload and the first indication of the token identifier being detected at the first layer. In some cases, the first feedback message includes an indication of the token identifier. In some cases, the first feedback message includes an indication of the token identifier.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may include a single antenna, or it may include a set of antennas.

Figure 7:
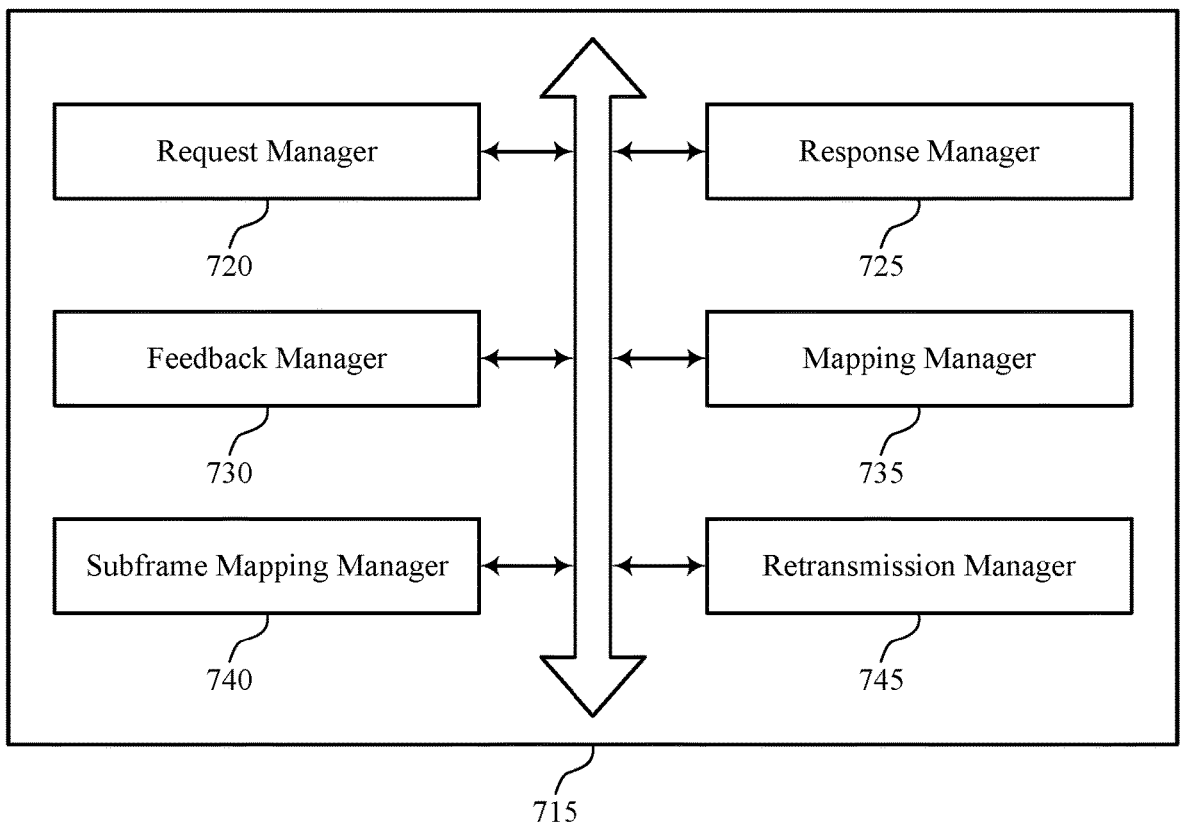

FIG. 7 shows a block diagram 700 of a feedback channel manager 715 that supports V2X feedback channel design, in accordance with one or more aspects of the present disclosure. The feedback channel manager 715 may be an example of aspects of a feedback channel manager 515, a feedback channel manager 615, or a feedback channel manager 815 described with reference to FIGS. 5, 6, and 8. The feedback channel manager 715 may include a request manager 720, a response manager 725, a feedback manager 730, a mapping manager 735, a subframe mapping manager 740, and a retransmission manager 745. Each of these modules may communicate, directly or indirectly, with one another (e.g., via one or more buses).

Request manager 720 may transmit a sensor data request message to a responding device, the sensor data request message including a token identifier associated with the sensor data request message. Request manager 720 may receive a sensor data request message from a requesting device, the sensor data request message including a token identifier associated with the sensor data request message.

Response manager 725 may receive, from the responding device, a sensor data response message, the sensor data response message including a first indication of the token identifier at a first layer and a second indication of the token identifier at a second layer, where the first layer is a physical layer that is a lower layer than the second layer. Response manager 725 may determine that the sensor data response message includes a set of token identifiers, each of the set of token identifiers associated with a corresponding sensor data request message. Response manager 725 may identify a portion of the sensor data response message having the token identifier associated with the transmitted sensor data request message. Response manager 725 may configure, at a first layer, a sensor data response message that includes a first indication of the token identifier and a sensor data payload. Response manager 725 may configure, at a second layer, a second indication of the token identifier to the sensor data response message, where the second layer is a physical layer that is a lower layer than the first layer. Response manager 725 may transmit the sensor data response message to the requesting device, identify a set of token identifiers, each of the set of token identifiers associated with a corresponding sensor data request message. Response manager 725 may and configure a portion of the sensor data response message having the token identifier associated with the received sensor data request message.

Feedback manager 730 may transmit a first feedback message responsive to detecting the first indication of the token identifier at the first layer. Feedback manager 730 may transmit a second feedback message responsive to successful decoding the sensor data response message by the second layer and detecting the second indication of the token identifier at the second layer. Feedback manager 730 may determine that the first indication is undetected at the first layer. Feedback manager 730 may refrain from transmitting the first feedback message based on the determining or transmitting the first feedback message that indicates the first indication was undetected at the first layer. Feedback manager 730 may receive a first feedback message from the requesting device, the first feedback message received responsive to the second indication of the token identifier being detected at the second layer. Feedback manager 730 may receive a second feedback message from the requesting device, the second feedback message received responsive to decoding the sensor data payload and the first indication of the token identifier being detected at the first layer. In some cases, the first feedback message includes an indication of the token identifier. In some cases, the first feedback message includes an indication of the token identifier.

Mapping manager 735 may identify a mapping between the received sensor data response message and the first feedback message, where the first feedback message is transmitted according to the mapping. Mapping manager 735 may identify a mapping between the received sensor data response message and a first feedback message, where the first feedback message is received according to the mapping. In some cases, the mapping includes the sensor data response message received on a control channel and the first feedback message transmitted on a feedback channel associated with sensor data.

Subframe mapping manager 740 may identify a subframe mapping configuration associated with detecting the first indication of the token identifier at the first layer, where the first feedback message is transmitted in a subframe according to the subframe mapping configuration. Subframe mapping manager 740 may identify a subframe mapping configuration associated with configuring the second indication of the token identifier at the second layer, where a first feedback message is received in a subframe according to the subframe mapping configuration. In some cases, the subframe mapping configuration includes transmitting the first feedback message in the same subframe as the sensor data response message is received in. In some cases, the subframe mapping configuration includes transmitting the first feedback message in a different subframe from the subframe that the sensor data response message is received in. In some cases, the subframe mapping configuration includes receiving the first feedback message in the same subframe as the sensor data response message is transmitted in. In some cases, the subframe mapping configuration includes receiving the first feedback message in a different subframe from the subframe that the sensor data response message is transmitted in.

Retransmission manager 745 may fail to receive a feedback message from the requesting device, and retransmit the sensor data response message.

Figure 8:
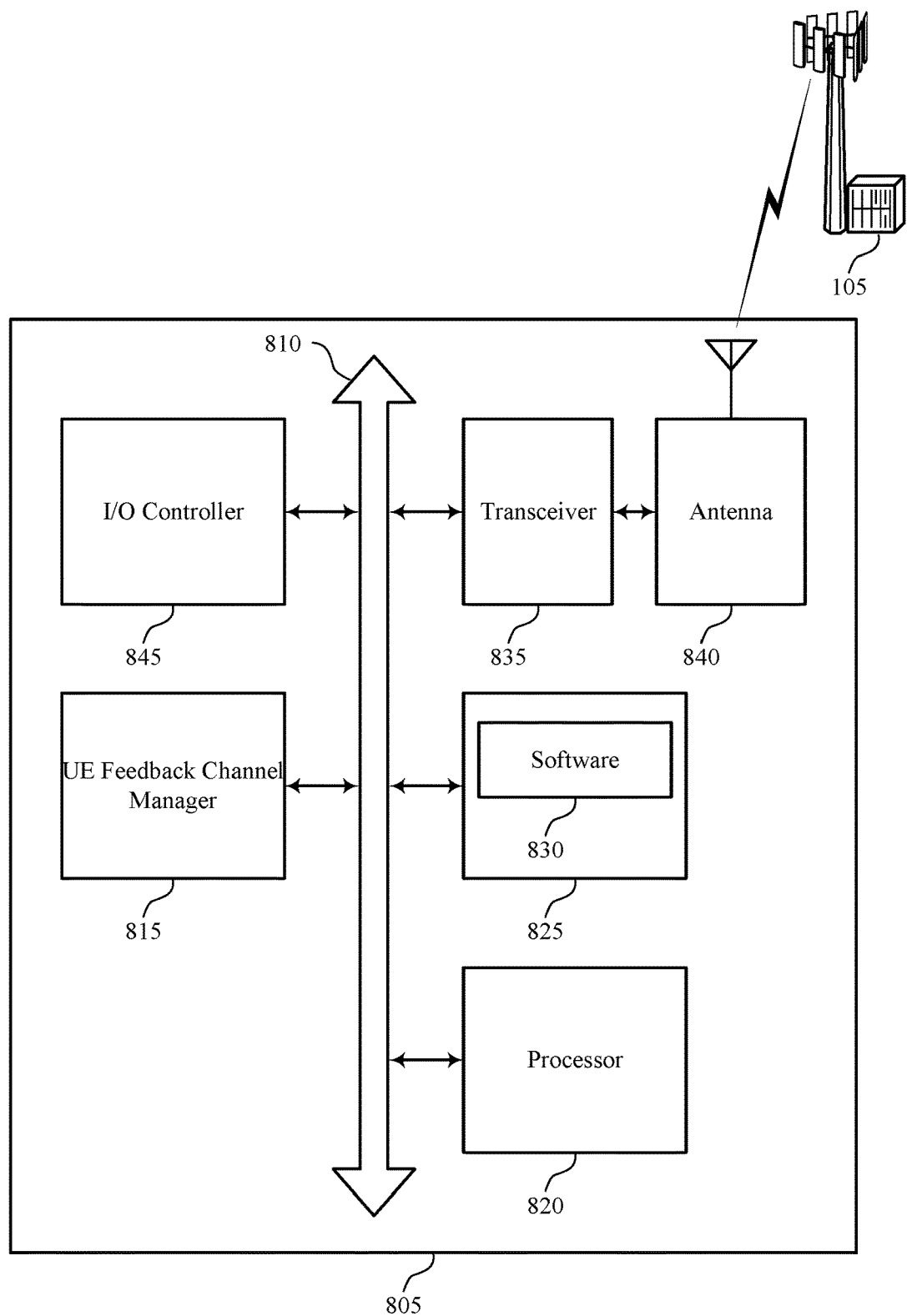
FIG. 8 illustrates a block diagram of a system including a UE that supports V2X feedback channel design, in accordance with one or more aspects of the present disclosure.

FIG. 8 shows a diagram of a system 800 including a device 805 that supports V2X feedback channel design, in accordance with one or more aspects of the present disclosure. Device 805 may be an example of or include the components of wireless device 505, wireless device 605, requesting device, responding device, or a UE 115 as described above, e.g., with reference to FIGS. 1 through 6. Device 805 may include components for bi-directional voice and data communications including components for transmitting and receiving communications, including a UE feedback channel manager 815, a processor 820, a memory 825, a software 830, a transceiver 835, an antenna 840, and an I/O controller 845. These components may be in electronic communication via one or more busses (e.g., bus 810). Device 805 may communicate wirelessly with one or more network devices 105.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting V2X feedback channel design).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware and/or software operation such as the interaction with peripheral components or devices.

Software 830 may include code to implement aspects of the present disclosure, including code to support V2X feedback channel design. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system. In other cases, I/O controller 845 may represent or interact with a modem, a keyboard, a mouse, a touchscreen, or a similar device. In some cases, I/O controller 845 may be implemented as part of a processor. In some cases, a user may interact with device 805 via I/O controller 845 or via hardware components controlled by I/O controller 845.

Figure 9:
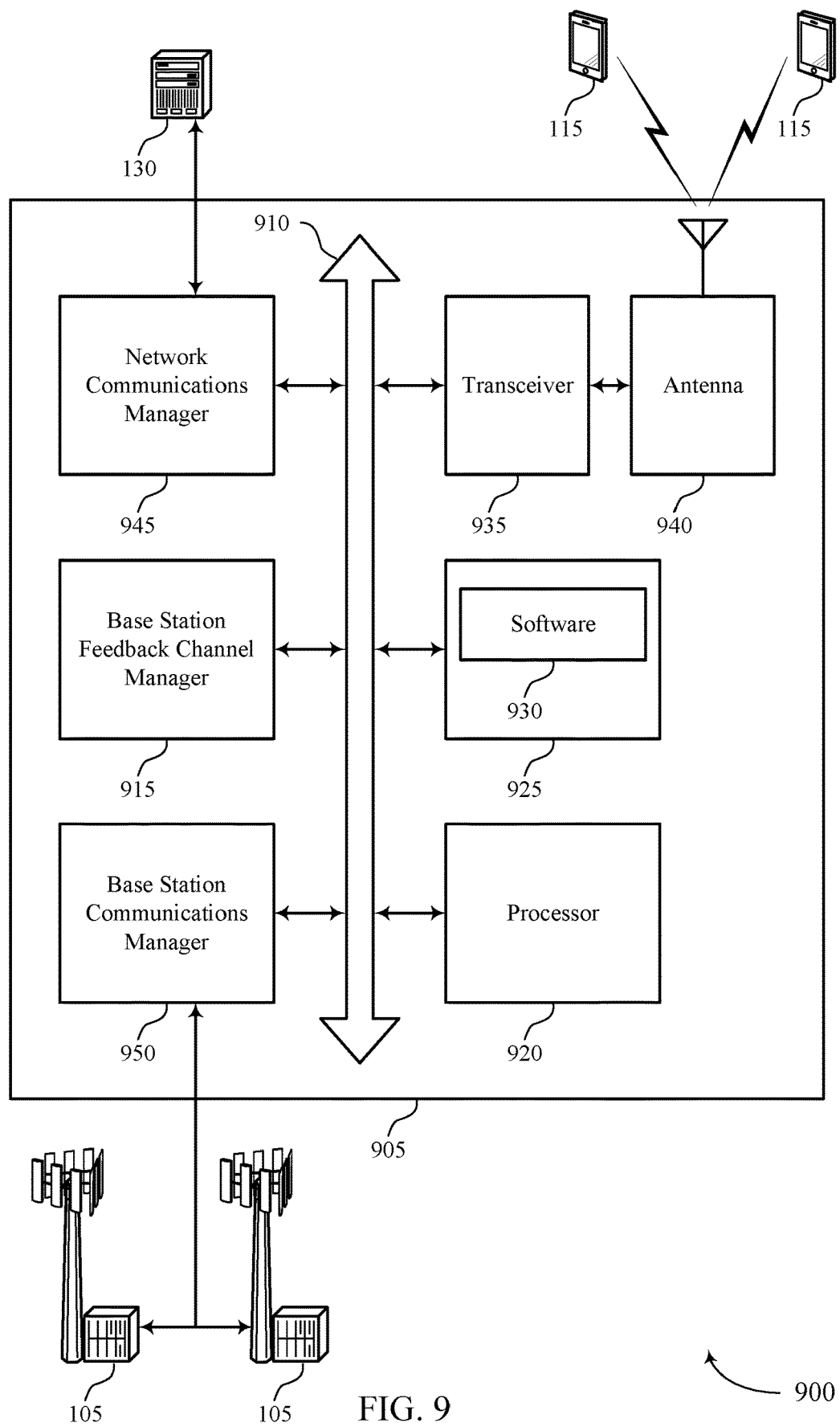
FIG. 9 illustrates a block diagram of a system including a base station that supports V2X feedback channel design, in accordance with one or more aspects of the present disclosure.

FIG. 9 shows a diagram of a system 900 including a device 905 that supports V2X feedback channel design, in accordance with one or more aspects of the present disclosure. Device 905 may be an example of or include the components of wireless device 605, wireless device 705, requesting device, responding device, or a network device 105 (e.g., a base station) as described above, e.g., with reference to FIGS. 1 through 7. Device 905 may include components for bi-directional voice and data communications including components for transmitting and receiving communications, including a base station feedback channel manager 915, a processor 920, a memory 925, a software 930, a transceiver 935, an antenna 940, a network communications manager 945, and a base station communications manager 950. These components may be in electronic communication via one or more busses (e.g., bus 910). Device 905 may communicate wirelessly with one or more UEs 115.

Processor 920 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting V2X feedback channel design).

Memory 925 may include RAM and ROM. The memory 925 may store computer-readable, computer-executable software 930 including instructions that, when executed, cause the processor to perform various functions described herein. In some cases, the memory 925 may contain, among other things, a BIOS which may control basic hardware and/or software operation such as the interaction with peripheral components or devices.

Software 930 may include code to implement aspects of the present disclosure, including code to support V2X feedback channel design. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

Network communications manager 945 may manage communications with the core network (e.g., via one or more wired backhaul links). For example, the network communications manager 945 may manage the transfer of data communications for client devices, such as one or more UEs 115.

Base station communications manager 950 may manage communications with other network device 105, and may include a controller or scheduler for controlling communications with UEs 115 in cooperation with other network devices 105. For example, the base station communications manager 950 may coordinate scheduling for transmissions to UEs 115 for various interference mitigation techniques such as beamforming or joint transmission. In some examples, base station communications manager 950 may provide an X2 interface within an LTE/LTE-A wireless communication network technology to provide communication between network devices 105.

Figure 10:
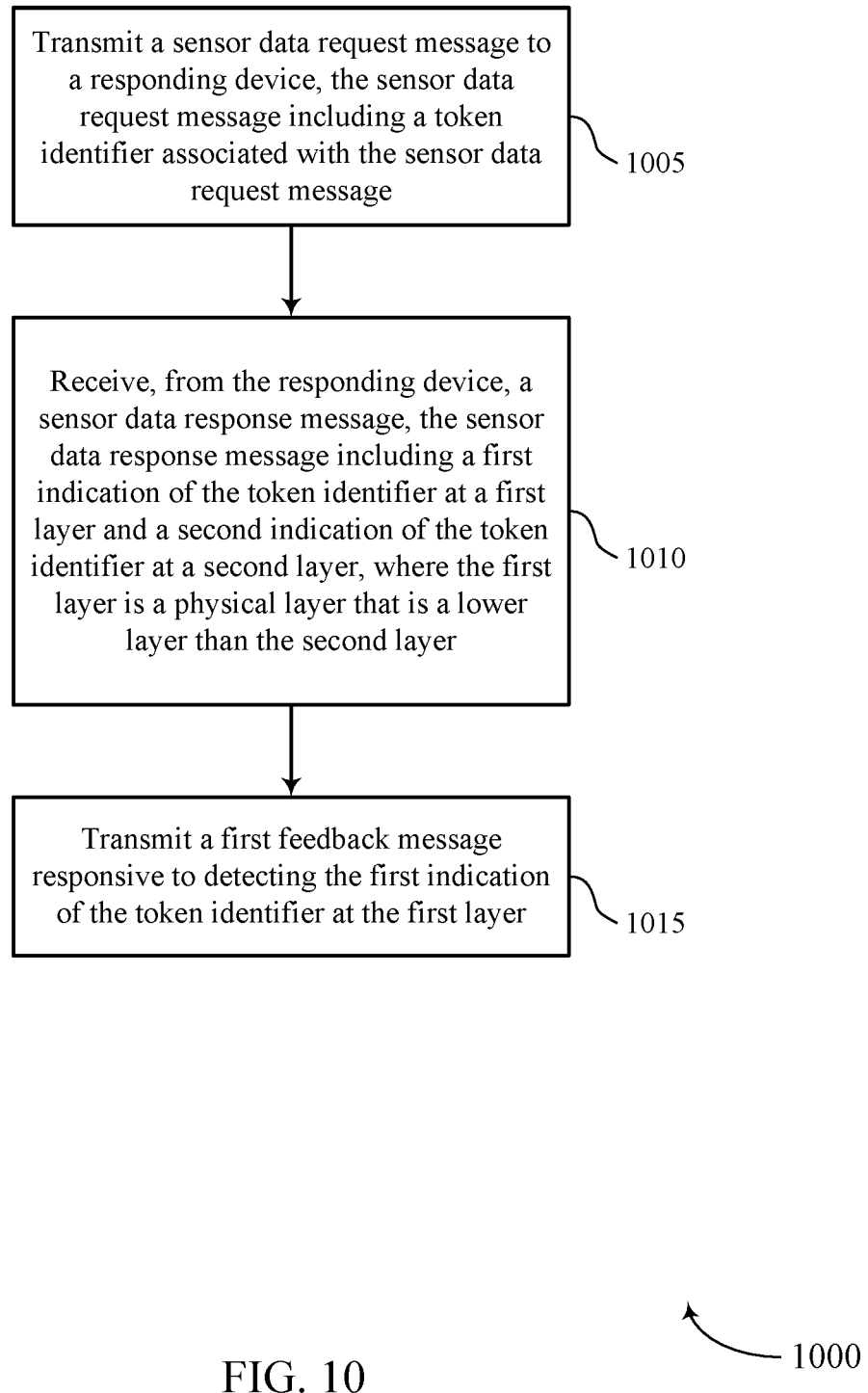
FIGS. 10 through 13 illustrate methods for V2X feedback channel design, in accordance with one or more aspects of the present disclosure.

FIG. 10 shows a flowchart illustrating a method 1000 for V2X feedback channel design, in accordance with one or more aspects of the present disclosure. The operations of method 1000 may be implemented by a UE 115, or a network device 105 or its components as described herein. For example, the operations of method 1000 may be performed by a feedback channel manager as described with reference to FIGS. 5 through 7. In some examples, a UE 115, or network device 105 may execute a set of codes to control the functional elements of the device to perform the functions described below. Additionally or alternatively, the UE 115, or network device 105 may perform aspects of the functions described below using special-purpose hardware.

At block 1005 the UE 115, or network device 105 may transmit a sensor data request message to a responding device, the sensor data request message comprising a token identifier associated with the sensor data request message. The operations of block 1005 may be performed according to the methods described with reference to FIGS. 1 through 4. In certain examples, aspects of the operations of block 1005 may be performed by a request manager as described with reference to FIGS. 5 through 7.

At block 1010 the UE 115, or network device 105 may receive, from the responding device, a sensor data response message, the sensor data response message comprising a first indication of the token identifier at a first layer and a second indication of the token identifier at a second layer, wherein the first layer is a physical layer that is a lower layer than the second layer. The operations of block 1010 may be performed according to the methods described with reference to FIGS. 1 through 4. In certain examples, aspects of the operations of block 1010 may be performed by a response manager as described with reference to FIGS. 5 through 7.

At block 1015 the UE 115, or network device 105 may transmit a first feedback message responsive to detecting the first indication of the token identifier at the first layer. The operations of block 1015 may be performed according to the methods described with reference to FIGS. 1 through 4. In certain examples, aspects of the operations of block 1015 may be performed by a feedback manager as described with reference to FIGS. 5 through 7.

Figure 11:
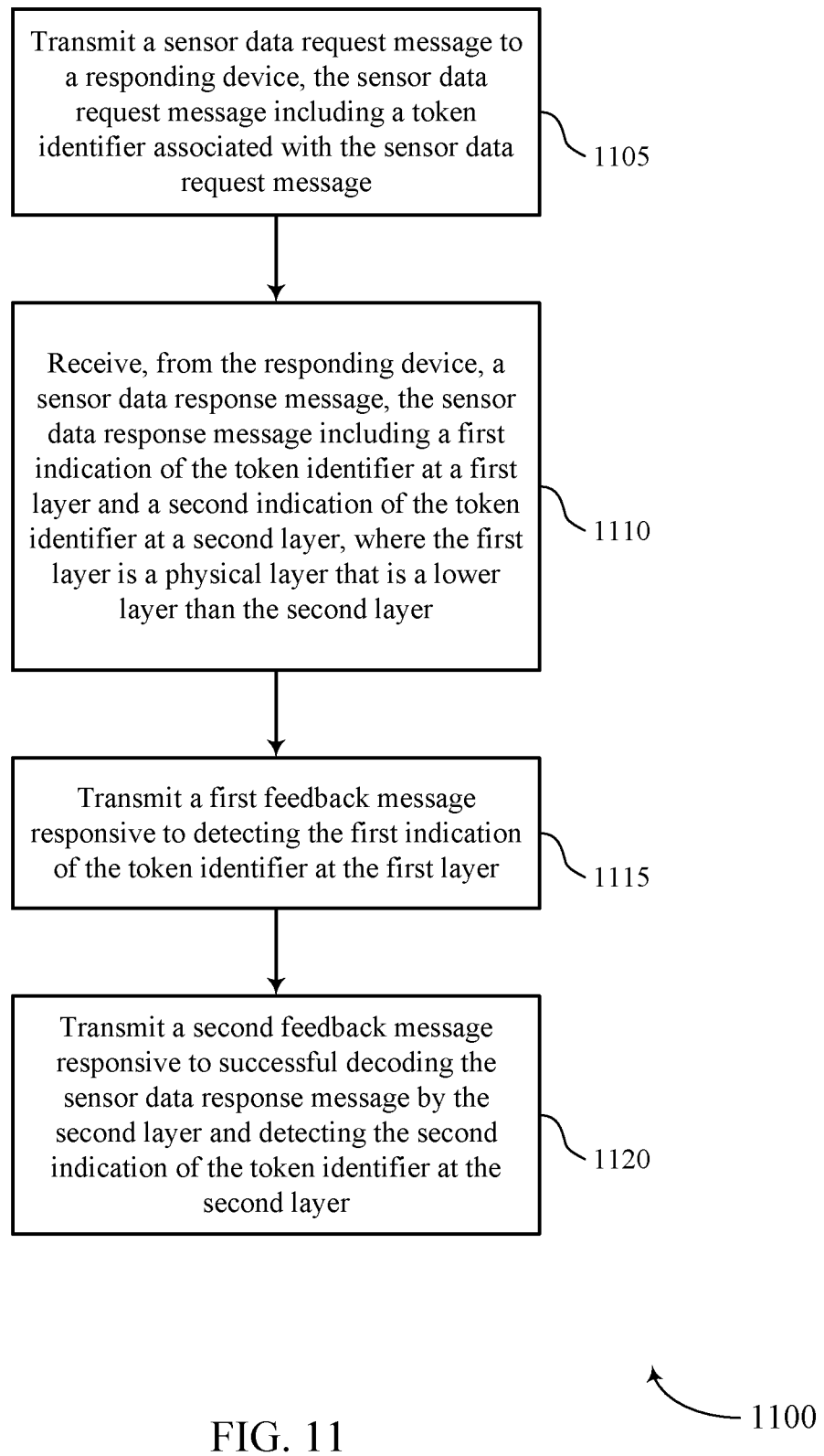

FIG. 11 shows a flowchart illustrating a method 1100 for V2X feedback channel design, in accordance with one or more aspects of the present disclosure. The operations of method 1100 may be implemented by a UE 115, or network device 105 or its components as described herein. For example, the operations of method 1100 may be performed by a feedback channel manager as described with reference to FIGS. 5 through 7. In some examples, a UE 115, or network device 105 may execute a set of codes to control the functional elements of the device to perform the functions described below. Additionally or alternatively, the UE 115, or network device 105 may perform aspects of the functions described below using special-purpose hardware.

At block 1105 the UE 115, or network device 105 may transmit a sensor data request message to a responding device, the sensor data request message comprising a token identifier associated with the sensor data request message. The operations of block 1105 may be performed according to the methods described with reference to FIGS. 1 through 4. In certain examples, aspects of the operations of block 1105 may be performed by a request manager as described with reference to FIGS. 5 through 7.

At block 1110 the UE 115, or network device 105 may receive, from the responding device, a sensor data response message, the sensor data response message comprising a first indication of the token identifier at a first layer and a second indication of the token identifier at a second layer, wherein the first layer is a physical layer that is a lower layer than the second layer. The operations of block 1110 may be performed according to the methods described with reference to FIGS. 1 through 4. In certain examples, aspects of the operations of block 1110 may be performed by a response manager as described with reference to FIGS. 5 through 7.

At block 1115 the UE 115, or network device 105 may transmit a first feedback message responsive to detecting the first indication of the token identifier at the first layer. The operations of block 1115 may be performed according to the methods described with reference to FIGS. 1 through 4. In certain examples, aspects of the operations of block 1115 may be performed by a feedback manager as described with reference to FIGS. 5 through 7.

At block 1120 the UE 115, or network device 105 may transmit a second feedback message responsive to successful decoding the sensor data response message by the second layer and detecting the second indication of the token identifier at the second layer. The operations of block 1120 may be performed according to the methods described with reference to FIGS. 1 through 4. In certain examples, aspects of the operations of block 1120 may be performed by a feedback manager as described with reference to FIGS. 5 through 7.

Figure 12:
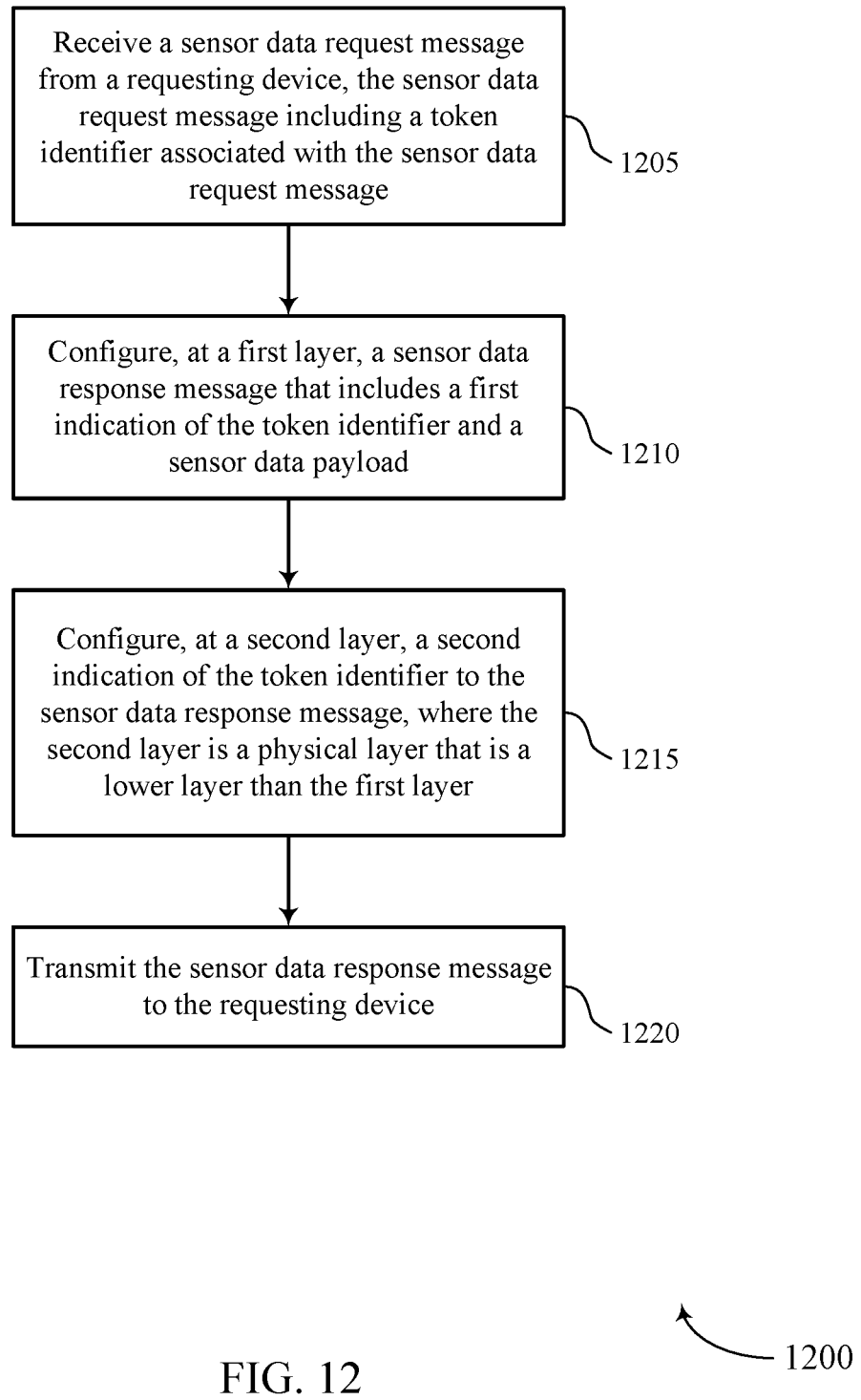

FIG. 12 shows a flowchart illustrating a method 1200 for V2X feedback channel design, in accordance with one or more aspects of the present disclosure. The operations of method 1200 may be implemented by a UE 115, or network device 105 or its components as described herein. For example, the operations of method 1200 may be performed by a feedback channel manager as described with reference to FIGS. 5 through 7. In some examples, a UE 115, or network device 105 may execute a set of codes to control the functional elements of the device to perform the functions described below. Additionally or alternatively, the UE 115, or network device 105 may perform aspects of the functions described below using special-purpose hardware.

At block 1205 the UE 115, or network device 105 may receive a sensor data request message from a requesting device, the sensor data request message comprising a token identifier associated with the sensor data request message. The operations of block 1205 may be performed according to the methods described with reference to FIGS. 1 through 4. In certain examples, aspects of the operations of block 1205 may be performed by a request manager as described with reference to FIGS. 5 through 7.

At block 1210 the UE 115, or network device 105 may configure, at a first layer, a sensor data response message that comprises a first indication of the token identifier and a sensor data payload. The operations of block 1210 may be performed according to the methods described with reference to FIGS. 1 through 4. In certain examples, aspects of the operations of block 1210 may be performed by a response manager as described with reference to FIGS. 5 through 7.

At block 1215 the UE 115, or network device 105 may configure, at a second layer, a second indication of the token identifier to the sensor data response message, wherein the second layer is a physical layer that is a lower layer than the first layer. The operations of block 1215 may be performed according to the methods described with reference to FIGS. 1 through 4. In certain examples, aspects of the operations of block 1215 may be performed by a response manager as described with reference to FIGS. 5 through 7.

At block 1220 the UE 115, or network device 105 may transmit the sensor data response message to the requesting device. The operations of block 1220 may be performed according to the methods described with reference to FIGS. 1 through 4. In certain examples, aspects of the operations of block 1220 may be performed by a response manager as described with reference to FIGS. 5 through 7.

Figure 13:
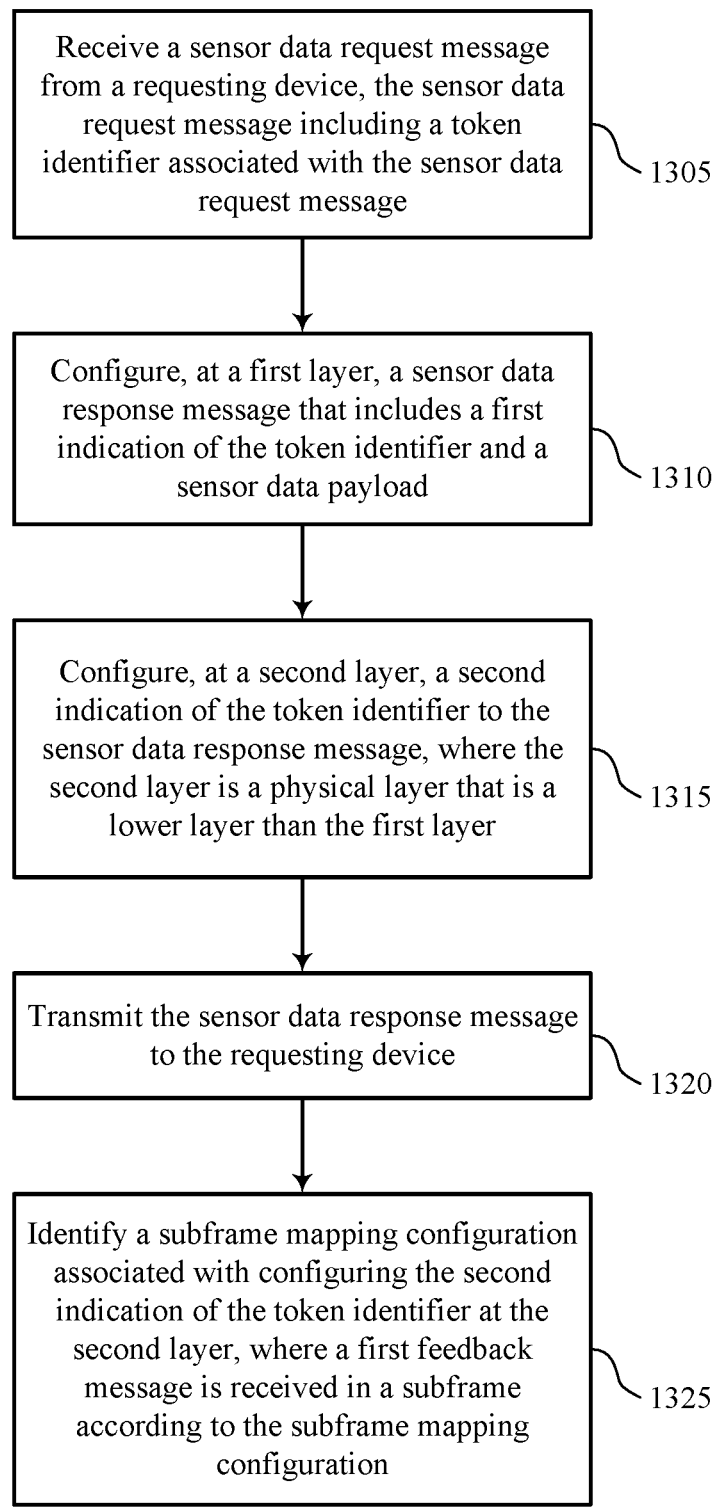

FIG. 13 shows a flowchart illustrating a method 1300 for V2X feedback channel design, in accordance with one or more aspects of the present disclosure. The operations of method 1300 may be implemented by a UE 115, or network device 105 or its components as described herein. For example, the operations of method 1300 may be performed by a feedback channel manager as described with reference to FIGS. 5 through 7. In some examples, a UE 115, or network device 105 may execute a set of codes to control the functional elements of the device to perform the functions described below. Additionally or alternatively, the UE 115, or network device 105 may perform aspects of the functions described below using special-purpose hardware.

At block 1305 the UE 115, or network device 105 may receive a sensor data request message from a requesting device, the sensor data request message comprising a token identifier associated with the sensor data request message. The operations of block 1305 may be performed according to the methods described with reference to FIGS. 1 through 4. In certain examples, aspects of the operations of block 1305 may be performed by a request manager as described with reference to FIGS. 5 through 7.

At block 1310 the UE 115, or network device 105 may configure, at a first layer, a sensor data response message that comprises a first indication of the token identifier and a sensor data payload. The operations of block 1310 may be performed according to the methods described with reference to FIGS. 1 through 4. In certain examples, aspects of the operations of block 1310 may be performed by a response manager as described with reference to FIGS. 5 through 7.

At block 1315 the UE 115, or network device 105 may configure, at a second layer, a second indication of the token identifier to the sensor data response message, wherein the second layer is a physical layer that is a lower layer than the first layer. The operations of block 1315 may be performed according to the methods described with reference to FIGS. 1 through 4. In certain examples, aspects of the operations of block 1315 may be performed by a response manager as described with reference to FIGS. 5 through 7.

At block 1320 the UE 115, or network device 105 may transmit the sensor data response message to the requesting device. The operations of block 1320 may be performed according to the methods described with reference to FIGS. 1 through 4. In certain examples, aspects of the operations of block 1320 may be performed by a response manager as described with reference to FIGS. 5 through 7.

At block 1325 the UE 115, or network device 105 may identify a subframe mapping configuration associated with configuring the second indication of the token identifier at the second layer, wherein a first feedback message is received in a subframe according to the subframe mapping configuration. The operations of block 1325 may be performed according to the methods described with reference to FIGS. 1 through 4. In certain examples, aspects of the operations of block 1325 may be performed by a subframe mapping manager as described with reference to FIGS. 5 through 7.

It should be noted that the methods described above describe possible implementations, and that the operations may be rearranged or otherwise modified and that other implementations are possible. Furthermore, aspects from two or more of the methods may be combined.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-Advanced (LTE-A) are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term eNB may be generally used to describe the base stations. The wireless communications system or systems described herein may include a heterogeneous LTE/LTE-A or NR network in which different types of eNBs provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNB, next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communication system 100 of FIG. 1—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
    transmitting a sensor data request message to a responding device, the sensor data request message comprising a token identifier associated with the sensor data request message;
    receiving, from the responding device, a sensor data response message, the sensor data response message comprising a first indication of the token identifier at a first layer portion of the sensor data response message and a second indication of the token identifier at a second layer portion of the sensor data response message, wherein the first layer is a physical layer that is a lower layer than the second layer, the first indication and the second indication of the token identifier associating the sensor data response message with the sensor data request message;
    transmitting a first feedback message responsive to detecting the first indication of the token identifier at the first layer portion of the sensor data response message; and
    transmitting a second feedback message responsive to successful decoding the sensor data response message by the second layer and detecting the second indication of the token identifier at the second layer.

2. The method of claim 1, further comprising:
    identifying a mapping between the received sensor data response message and the first feedback message, wherein the first feedback message is transmitted according to the mapping.

3. The method of claim 2, wherein:
    the mapping comprises the sensor data response message received on a control channel and the first feedback message transmitted on a feedback channel associated with sensor data.

4. The method of claim 1, wherein:
    the first feedback message comprises an indication of the token identifier.

5. The method of claim 1, further comprising:
    identifying a subframe mapping configuration associated with detecting the first indication of the token identifier at the first layer portion of the sensor data response message, wherein the first feedback message is transmitted in a subframe according to the subframe mapping configuration.

6. The method of claim 5, wherein:
    the subframe mapping configuration comprises transmitting the first feedback message in the same subframe as the sensor data response message is received in.

7. The method of claim 5, wherein:
the subframe mapping configuration comprises transmitting the first feedback message in a different subframe from the subframe that the sensor data response message is received in.

8. An apparatus for wireless communication, comprising:
a processor;
memory coupled with the processor; and
instructions stored in the memory and executable by the processor to cause the apparatus to:
 transmit a sensor data request message to a responding device, the sensor data request message comprising a token identifier associated with the sensor data request message;
 receive, from the responding device, a sensor data response message, the sensor data response message comprising a first indication of the token identifier at a first layer portion of the sensor data response message and a second indication of the token identifier at a second layer portion of the sensor data response message, wherein the first layer is a physical layer that is a lower layer than the second layer, the first indication and the second indication of the token identifier associating the sensor data response message with the sensor data request message;
 transmit a first feedback message responsive to detecting the first indication of the token identifier at the first layer portion of the sensor data response message; and
 transmit a second feedback message responsive to successful decoding the sensor data response message by the second layer and detecting the second indication of the token identifier at the second layer.

9. The apparatus of claim 8, wherein the instructions are further executable by the processor to cause the apparatus to:
identify a mapping between the received sensor data response message and the first feedback message, wherein the first feedback message is transmitted according to the mapping.

10. The apparatus of claim 9, wherein the mapping comprises the sensor data response message received on a control channel and the first feedback message transmitted on a feedback channel associated with sensor data.

11. The apparatus of claim 8, wherein the first feedback message comprises an indication of the token identifier.

\* \* \* \* \*